US008284244B2

(12) United States Patent
Iwasaki et al.

(10) Patent No.: US 8,284,244 B2
(45) Date of Patent: Oct. 9, 2012

(54) SIGNAL PROCESSING SYSTEM

(75) Inventors: Tomoki Iwasaki, Fuchu (JP); Susumu Kawata, Hachioji (JP)

(73) Assignee: Olympus Medical Systems Corp., Tokyo (JP)

(*) Notice: Subject to any disclaimer, the term of this patent is extended or adjusted under 35 U.S.C. 154(b) by 907 days.

(21) Appl. No.: 12/355,172

(22) Filed: Jan. 16, 2009

(65) Prior Publication Data

US 2009/0207242 A1   Aug. 20, 2009

(30) Foreign Application Priority Data

Feb. 15, 2008   (JP) .................. 2008-034995

(51) Int. Cl.
*A61B 1/04* (2006.01)
(52) U.S. Cl. ........................................ 348/68
(58) Field of Classification Search .......... 348/45, 348/46, 65, 68, 74
See application file for complete search history.

(56) References Cited

U.S. PATENT DOCUMENTS

| | | | | |
|---|---|---|---|---|
| 5,022,382 A * | 6/1991 | Ohshoji et al. | ............... | 600/156 |
| 5,164,824 A * | 11/1992 | Ieoka et al. | .................. | 348/71 |
| 6,078,681 A * | 6/2000 | Silver | .......................... | 382/133 |
| 6,293,911 B1 * | 9/2001 | Imaizumi et al. | ............ | 600/160 |
| 6,322,496 B1 * | 11/2001 | Iida et al. | ..................... | 600/118 |
| 6,436,032 B1 * | 8/2002 | Eto et al. | ....................... | 600/117 |
| 6,464,633 B1 * | 10/2002 | Hosoda et al. | ............... | 600/178 |
| 6,682,479 B1 * | 1/2004 | Takahashi et al. | ............ | 600/159 |
| 7,179,222 B2 * | 2/2007 | Imaizumi et al. | ............ | 600/109 |
| 7,289,139 B2 * | 10/2007 | Amling et al. | .................. | 348/65 |
| 7,476,213 B2 * | 1/2009 | Uesugi et al. | .................. | 604/26 |
| 7,725,131 B2 * | 5/2010 | Wood et al. | ..................... | 455/558 |
| 2002/0126204 A1 * | 9/2002 | Takeshige et al. | ............. | 348/74 |
| 2003/0050532 A1 * | 3/2003 | Doguchi | ....................... | 600/109 |
| 2004/0186351 A1 * | 9/2004 | Imaizumi et al. | ............ | 600/160 |
| 2004/0225185 A1 * | 11/2004 | Obata et al. | ................... | 600/118 |
| 2006/0004322 A1 * | 1/2006 | Uesugi et al. | ................... | 604/26 |
| 2007/0088193 A1 * | 4/2007 | Omori et al. | .................. | 600/101 |
| 2008/0027278 A1 * | 1/2008 | Mizuno | ......................... | 600/109 |
| 2010/0072898 A1 * | 3/2010 | Ohashi et al. | ................. | 315/127 |

FOREIGN PATENT DOCUMENTS

| | | |
|---|---|---|
| EP | 1 884 183 A1 | 2/2008 |
| JP | 2002-263063 | 9/2002 |
| JP | 2005-111080 | 4/2005 |
| WO | WO 01/71500 A1 | 9/2001 |

OTHER PUBLICATIONS

European Search Report dated Oct. 16, 2009.

* cited by examiner

*Primary Examiner* — Ario Etienne
*Assistant Examiner* — Sargon Nano
(74) *Attorney, Agent, or Firm* — Scully, Scott, Murphy & Presser, P.C.

(57) ABSTRACT

A user system includes a log read-out section for reading out setting state log data, a log data sending section for sending the setting state log data, and a restoration operation activating section for receiving a restore command and performs a restoration operation. A remote operation system includes a log data receiving section for receiving the setting state log data, a log data analyzing section for analyzing the setting state log data, a communication requesting section for requesting sending of the setting state log data, and a restore command sending section for sending a restore command.

13 Claims, 28 Drawing Sheets

FIG.5

OPERATION LOG DATA FORMAT CONFIGURATION

| 0 | 1 | 2 | 3 | 4 | 7 | 8 | 9 | 10 | | | n (BYTE) |
|---|---|---|---|---|---|---|---|----|---|---|---|
| Stx | ITEM | MO | DD | HH | MT | SEC | Len | DATA | | | |

FIG.6

Stx: HEADER DATA (7-TH BIT IS START BIT)

| 7 | 6 | 5 | 4 | 3 | 2 | 1 | 0 |
|---|---|---|---|---|---|---|---|
| 1 | 0 | 0 | 0 | 0 | 0 | 0 | 0 |

FIG.7

ITEM: DATA IDENTIFIER IS 5-BITS DENOTED (1-26)

| 7 | 6 | 5 | 4 | 3 | 2 | 1 | 0 |
|---|---|---|---|---|---|---|---|
| 0 | 0 | 0 | x | x | x | x | x |

FIG.8

MO-SEC: MONTH/DATE/HOUR/MINUTE/SECOND (TIME STAMP)

| 7 | 6 | 5 | 4 | 3 | 2 | 1 | 0 | |
|---|---|---|---|---|---|---|---|---|
| 0 | 0 | 0 | 0 | x | x | x | x | MONTH IS 4-BITS DENOTED (1-12) |
| 0 | 0 | 0 | x | x | x | x | x | DATE IS 5-BITS DENOTED (1-31) |
| 0 | 0 | 0 | x | x | x | x | x | HOUR IS 5-BITS DENOTED (0-24) |
| 0 | 0 | x | x | x | x | x | x | MINUTE IS 6-BITS DENOTED (0-59) |
| 0 | 0 | x | x | x | x | x | x | SECOND IS 6-BITS DENOTED (0-59) |

FIG.9

Len: DATA LENGTH

| 0 | 0 | x | x | x | x | x | x | DATA LENGTH IS 6-BITS DENOTED (0-38) |
|---|---|---|---|---|---|---|---|---|

FIG.10

DATA CONFIGURATION

| ITEM | EXPLANATION | Len | DATA |
|---|---|---|---|
| 1 | WHITE BALANCE | 1 | 0x01=SWITCH ON |
| 2 | EXPOSURE | 1 | 0x01=SWITCH ON |
| 3 | IRIS | 1 | 0x01=SWITCH ON |
| 4 | AGC | 1 | 0x01=SWITCH ON |
| 5 | COLOR TONE SETTING R | 1 | 0x01=SWITCH ON |
| 6 | COLOR TONE SETTING B | 1 | 0x01=SWITCH ON |
| 7 | COLOR TONE SETTING C | 1 | 0x01=SWITCH ON |
| 8 | COLOR MODE SETTING | 1 | 0x01=SWITCH ON |
| 9 | IMAGE EMPHASIS | 1 | 0x01=SWITCH ON |
| 10 | ELECTRONIC ZOOM | 1 | 0x01=SWITCH ON |
| 11 | IMAGE SIZE SWITCHING | 1 | 0x01=SWITCH ON |
| 12 | COLOR BAR DISPLAY | 1 | 0x01=SWITCH ON |
| 13 | PATIENT DATA PRE-REGISTRATION | 38 | REGISTRATION No. SIZE=1, VALUE=1-40 |
| 14 | | | ID No. SIZE=16, PADDING=NULL |
| 15 | | | PATIENT NAME SIZE=21, PADDING=NULL |
| 16 | MEMORY CARD | 5 | FILE INFORMATION FILE NAME IDENTIFICATION (SIZE=4) |
| 17 | | | EXTENSION IDENTIFICATION (SIZE=1) T=TIF |
| 18 | | | ID No. SIZE=16, PADDING=NULL (UNUSED) |
| 19 | | | PATIENT NAME SIZE=21, PADDING=NULL (UNUSED) |
| 20 | SPECIAL LIGHT OBSERVATION | 1 | LIGHT TYPE 0x00=NORMAL, 0x01=NBI, 0x02=PDD, 0x03=IR |
| 21 | USER PRESET | 1 | No. SIZE=1, 1-20 |
| 22 | IMAGE SOURCE SWITCHING | 1 | SETTING VALUE SIZE=1, 0x01=SCOPE, 0x02=D.F., 0x03=PRINTER, |
| 23 | | | 0x04=VTR, 0x05=AUX, 0x00=NG |
| 24 | SETTING RESET | 1 | 0x01=SWITCH ON |
| 25 | CONTRAST MODE | 1 | 0x01=SWITCH ON |
| 26 | EXAM END | 1 | 0x01=SWITCH ON |

FIG.11

FORMAT CONFIGURATION OF SETTING STATE LOG DATA

| 0 | 1 | 2 | 3 | 4 | 7 | 8 | 9 | 10 | | | n (BYTE) |
|---|---|---|---|---|---|---|---|---|---|---|---|
| Stx | ITEM | MO | DD | HH | MT | SEC | Len | DATA | | | |

FIG.12

DATA CONFIGURATION

| ITEM | EXPLANATION | Len | DATA | |
|---|---|---|---|---|
| 1 | WHITE BALANCE | 1 | OK/NG | 0x00, 0xff |
| 2 | EXPOSURE | 1 | SETTING VALUE | -8 – +8 |
| 3 | IRIS | 1 | AUTO/PEAK | 0x01, 0x02 |
| 4 | AGC | 1 | ON/OFF | 0x01, 0x00 |
| 5 | COLOR TONE SETTING R | 1 | R SETTING VALUE | -8 – +8 |
| 6 | COLOR TONE SETTING B | 1 | B SETTING VALUE | -8 – +8 |
| 7 | COLOR TONE SETTING C | 1 | C SETTING VALUE | -8 – +8 |
| 8 | COLOR MODE SETTING | 1 | SETTING VALUE | 0x00=NORMAL, 0x01=MODE1 - 0x03:MODE3 |
| 9 | IMAGE EMPHASIS | 1 | SETTING VALUE | 0-24 |
| 10 | ELECTRONIC ZOOM | 1 | MAGNIFICATION | 0x01=ONE TIME, 0x02=1.2 TIMES, 0x05=1.5 TIMES |
| 11 | SCREEN SIZE SWITCHING | 1 | SETTING VALUE | 0x01=SMALL, 0x02=MEDIUM, 0x03=SEMI-FULL |
| 12 | HDTV OUTPUT | 1 | DISPLAY ASPECT RATIO | 5=5:4, 4=4:3 |
| 13 | SPECIAL LIGHT OBSERVATION | 1 | LIGHT TYPE | 0x00=NORMAL, 0x01=NBI, 0x02=PDD, 0x03=IR |
| 14 | CONTRAST MODE | 1 | SETTING VALUE (SIZE=1, IN NORMAL LIGHT OBSERVATION: 1=NORMAL, 2=LOW, 3=HIGH | |

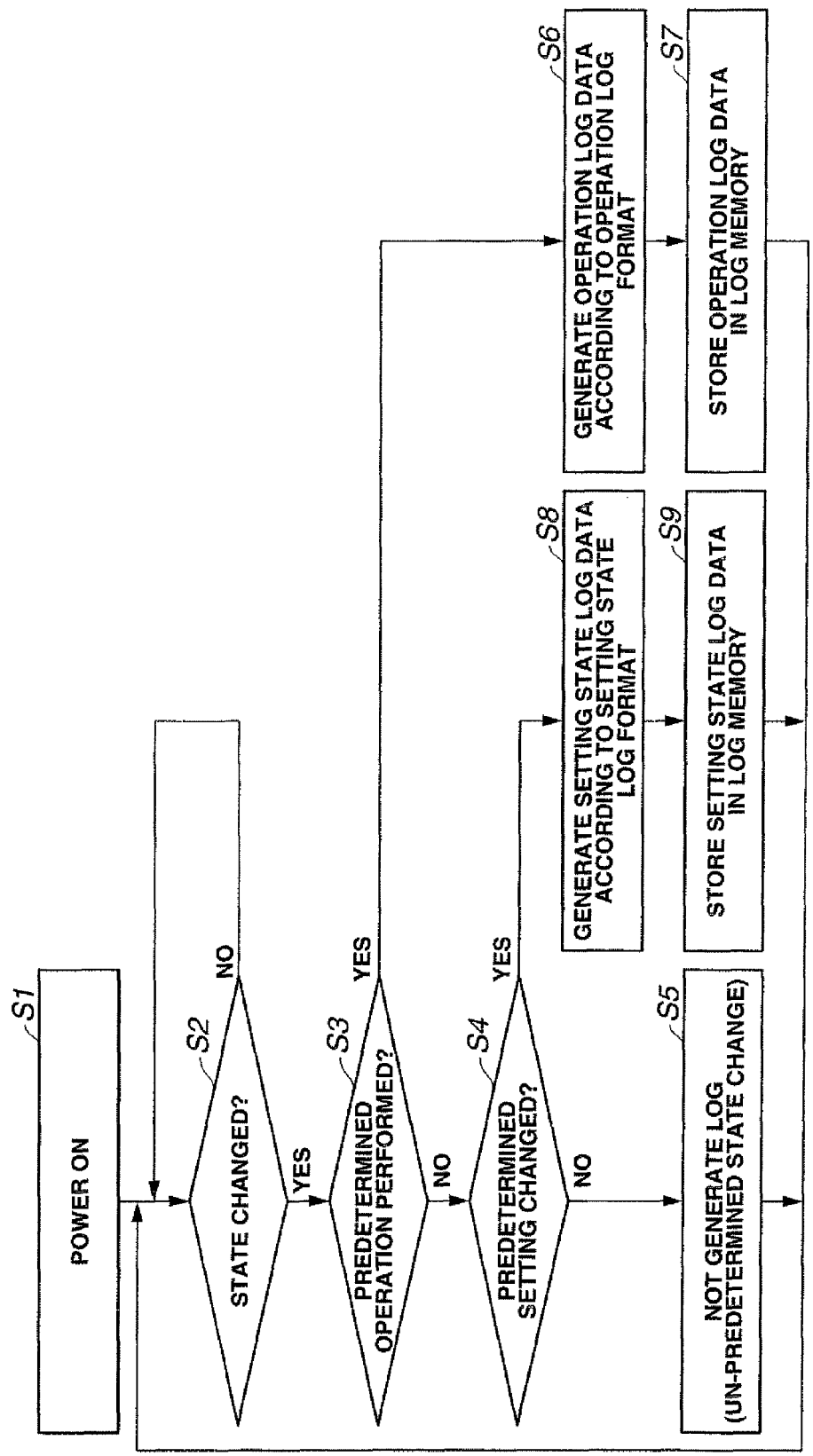

FORMAT CONFIGURATION OF LED CONTROL INSTRUCTION COMMAND

CMD: COMMAND x=0 OR 1

FIG.19

CMD COMMAND IN DETAIL

| CMD | CONTENT OF LED CONTROL |
|---|---|
| 0x00 | RESERVED |
| 0x01 | TURN OFF ALL FRONT PANEL LEDS (FRONT PANEL LED) |
| 0x02 | TURN OFF ALL KEYBOARD LEDS (FRONT PANEL LED) |
| 0x03 | BLINK WHITE BALANCE SWITCH LED (FRONT PANEL LED) |
| 0x04 | BLINK EXPOSURE [UP] SWITCH LED (FRONT PANEL LED) |
| 0x05 | BLINK EXPOSURE [DOWN] SWITCH LED (FRONT PANEL LED) |
| 0x06 | BLINK IRIS SWITCH LED (FRONT PANEL LED) |
| 0x07 | BLINK COLOR TONE SETTING R [UP] SWITCH LED (FRONT PANEL LED) |
| 0x08 | BLINK COLOR TONE SETTING R [DOWN] SWITCH LED (FRONT PANEL LED) |
| 0x09 | BLINK COLOR TONE SETTING G [UP] SWITCH LED (FRONT PANEL LED) |
| 0x0A | BLINK COLOR TONE SETTING G [DOWN] SWITCH LED (FRONT PANEL LED) |
| 0x0B | BLINK COLOR TONE SETTING C [UP] SWITCH LED (FRONT PANEL LED) |
| 0x0C | BLINK COLOR TONE SETTING C [DOWN] SWITCH LED (FRONT PANEL LED) |
| 0x0D | BLINK IMAGE EMPHASIS SWITCH LED (FRONT PANEL LED) |
| 0x0E | BLINK OBSERVATION MODE CHANGE-OVER SWITCH LED (FRONT PANEL LED) |
| 0x0F | BLINK IMAGE SOURCE CHANGE-OVER SWITCH LED (FRONT PANEL LED) |
| 0x10 | BLINK RESET SWITCH LED (KEYBOARD LED) |
| 0x11 | BLINK AGC SWITCH LED (KEYBOARD LED) |
| 0x12 | BLINK COLOR MODE SWITCH LED (KEYBOARD LED) |
| 0x13 | BLINK ELECTRONIC ZOOM SWITCH LED (KEYBOARD LED) |
| 0x14 | BLINK SCREEN SIZE CHANGE-OVER SWITCH LED (KEYBOARD LED) |
| 0x15 | BLINK COLOR BAR SWITCH LED (KEYBOARD LED) |
| 0x16 | BLINK CONTRAST SWITCH LED (KEYBOARD LED) |
| 0x17 | BLINK INSPECTION END SWITCH LED (KEYBOARD LED) |
| 0x18 AND ONWARDS | RESERVED |

FIG.24

CMD COMMAND IN DETAIL

| CMD | MESSAGE DISPLAYED |
|---|---|
| 0x20 | RESERVED |
| 0x21 | RE-ACTIVATE POWER |
| 0x22 | IMPLEMENT WHITE BALANCE ADJUSTMENT |
| 0x23 | SET EXPOSURE TO ±0 |
| 0x24 | PRESS IRIS SWITCH |
| 0x25 | PRESS AGC SWITCH |
| 0x26 | SET COLOR TONE SETTING R TO ±0 |
| 0x27 | SET COLOR TONE SETTING G TO ±0 |
| 0x28 | SET COLOR TONE SETTING C TO ±0 |
| 0x29 | SET COLOR MODE TO MODE 1 |
| 0x2A | PRESS IMAGE EMPHASIS SWITCH |
| 0x2B | PRESS ELECTRONIC ZOOM SWITCH |
| 0x2C | PRESS SCREEN SIZE CHANGE-OVER SWITCH |
| 0x2D | PRESS COLOR BAR SWITCH |
| 0x2E | PRESS PATIENT DATA CALL SWITCH |
| 0x2F | PRESS PATIENT DATA REGISTRATION SWITCH |
| 0x30 | PRESS PATIENT DATA CLEAR SWITCH |
| 0x31 | INSERT MEMORY CARD |
| 0x32 | FORMAT MEMORY CARD |
| 0x33 | PRESS OBSERVATION MODE CHANGE-OVER SWITCH |
| 0x34 | PRESS USER PRESET CALL SWITCH |
| 0x35 | PRESS USER PRESET REGISTRATION SWITCH |
| 0x36 | PRESS USER PRESET CLEAR SWITCH |
| 0x37 | PRESS IMAGE SOURCE CHANGE-OVER SWITCH |
| 0x38 | PRESS RESET SWITCH |
| 0x39 | PRESS CONTRAST SWITCH |
| 0x3A | PRESS INSPECTION END SWITCH |
| 0x3B | CHECK HDTV OUTPUT ASPECT RATIO |
| 0x3C | CHECK SCOPE CONNECTION STATE |
| 0x3D | CHECK LIGHT SOURCE APPARATUS CONNECTION STATE |
| 0x3E | COMPLETE! |
| 0x3F AND ONWARDS | RESERVED |

FORMAT CONFIGURATION OF
TOUCH PANEL CONTROL COMMAND

FIG.34

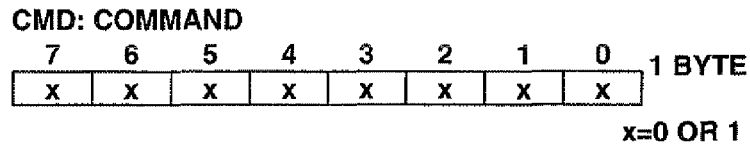

CMD: COMMAND

| 7 | 6 | 5 | 4 | 3 | 2 | 1 | 0 |
|---|---|---|---|---|---|---|---|
| x | x | x | x | x | x | x | x |

1 BYTE x=0 OR 1

FIG.35

CMD COMMAND IN DETAIL

| CMD | CONTROL TARGET TOUCH PANEL SWITCH |
|---|---|
| 0x00 | RESERVED |
| 0x01 | ALL TOUCH PANEL SWITCHES |
| 0x02 | RESET SWITCH |
| 0x03 | WHITE BALANCE SWITCH |
| 0x04 | EXPOSURE [UP] SWITCH |
| 0x05 | EXPOSURE [DOWN] SWITCH |
| 0x06 | COLOR TONE SETTING R [UP] SWITCH |
| 0x07 | COLOR TONE SETTING R [DOWN] SWITCH |
| 0x08 | COLOR TONE SETTING G [UP] SWITCH |
| 0x09 | COLOR TONE SETTING G [DOWN] SWITCH |
| 0x0A | COLOR TONE SETTING C [UP] SWITCH |
| 0x0B | COLOR TONE SETTING C [DOWN] SWITCH |
| 0x0C | LIGHT MEASUREMENT CHANGE-OVER SWITCH |
| 0x0D | OBSERVATION MODE CHANGE-OVER SWITCH |
| 0x0E | IMAGE SOURCE CHANGE-OVER SWITCH |
| 0x0F AND ONWARDS | RESERVED |

FIG.36

CLR:

| 0 | 0 | 0 | 0 | 0 | x | x | x | 1 BYTE

COLOR ASSIGNMENT (000=WHITE, 001=BLACK, 010=RED, 011=BLUE, 100=GREEN)

FIG.37

DSP:

| 0 | 0 | 0 | 0 | 0 | 0 | x | x | 1 BYTE

DISPLAY STATE ASSIGNMENT (00=TURN-OFF, 01=TURN-ON, 10=BLINK)

SIGNAL PROCESSING SYSTEM

This application claims benefit of Japanese Application No. 2008-034995 filed in Japan on Feb. 15, 2008, the contents of which are incorporated herein by this reference.

BACKGROUND OF THE INVENTION

1. Field of the Invention

The present invention relates to a signal processing system for processing signals using a plurality of instruments including an image pickup apparatus for picking up subject images.

2. Description of Related Art

Endoscopes are widely used in medical and industrial fields. Recent years have seen wide use of endoscope apparatuses that include an endoscope equipped with an external television camera, which is constructed by attaching a television camera having image pickup means to the eye cup of the optical endoscope, or include an electronic endoscope having image pickup means built in the distal end portion of the endoscope, and display an image captured by the endoscope on the monitor to enable the user to perform observation and treatment while viewing the displayed image.

These endoscope apparatuses employ a light source apparatus for supplying illumination light to the endoscope, a camera control unit (also referred to as "video processor") including an image signal processing circuit for displaying an endoscopic image, a TV monitor for displaying the endoscopic image, as well as a plurality of peripheral apparatuses such as, e.g., an insufflation apparatus and high frequency cauterization apparatus. An endoscope system that allows treatment or surgery to be carried out under endoscopic observation is thus constructed and has been practically used.

In such an endoscope system, the plurality of peripheral apparatuses are typically connected to a system controller for concentrated control.

The peripheral apparatuses of the endoscope system are equipped with electronic instruments such as an image pickup device and image processing means, precise mechanisms such as filter drive mechanism for sequentially irradiating light beams of RGB three colors, and consumable items such as a light source lamp, etc. Therefore the peripheral apparatuses normally require periodical maintenance by maintenance workers having related expertise.

In many cases, however, a single maintenance worker is in charge of maintaining a plurality of electronic endoscopes and the endoscope processors. In some cases, the maintenance worker carries out the work of maintaining electronic endoscopes and endoscope processors that are remotely located. This situation has caused problems including high maintenance cost and inability to quickly address abnormalities that the electronic endoscopes and endoscope processor may have.

To solve these problems, e.g., Japanese Patent Application Laid-Open Publication No. 2002-263063 discloses an endoscope system that allows the maintenance work to be quickly conducted even at a remote location, employing a technique which allows a remotely located service server to monitor endoscope processors installed in a plurality of facilities and instruments connected to the endoscope processors.

Further, e.g., Japanese Patent Application Laid-Open Publication No. 2005-111080 proposes a surgery support system that during surgery constantly maintains the settings of instruments in the surgery room at appropriate states, thus enabling it to remotely provide an appropriate surgery support.

SUMMARY OF THE INVENTION

A signal processing system according to the present invention includes: a signal processing unit including: a video signal processing section for processing an image-pickup signal obtained by an image-pickup section picking up an image of a subject, and generating a video signal displayable on a display section; and a light source for supplying illumination light for illuminating the subject; a control section for controlling, based on a setting value, operation of at least one of an internal circuit of the image-pickup section, an internal circuit of the video signal processing section, and an internal circuit of the light source; a setting value changing section for changing the setting value; a log recording section for recording change history of the setting value as log data; a data sending section for sending the log data to an external instrument via a network; and a command receiving section for receiving a control command which is based on the log data from the external instrument via the network. The control section controls the setting value changing section based on the control command.

BRIEF DESCRIPTION OF THE DRAWINGS

FIG. 5 is a view showing a data format configuration of operation log data to be stored in a log memory of FIG. 2.

FIG. 6 is a first view showing a specific data configuration of the data format configuration of FIG. 5.

FIG. 7 is a second view showing a specific data configuration of the data format configuration of FIG. 5.

FIG. 8 is a third view showing a specific data configuration of the data format configuration of FIG. 5.

FIG. 9 is a fourth view showing a specific data configuration of the data format configuration of FIG. 5.

FIG. 10 is a fifth view showing a specific data configuration of the data format configuration of FIG. 5.

FIG. 11 is a view showing a data format configuration of setting state log data to be stored in the log memory of FIG. 2.

FIG. 12 is a view showing a specific data configuration of the data format configuration of FIG. 11.

FIG. 13 is a flow chart showing a flow of a processing for storing system log data in the CCU of FIG. 2.

FIG. 19 is a view illustrating the content of the restore command of FIG. 17.

FIG. 24 is a view illustrating the content of a modification example of the restore command of FIG. 17.

FIG. 34 is a first view illustrating the touch panel control command of FIG. 33.

FIG. 35 is a second view illustrating the touch panel control command of FIG. 33.

FIG. 36 is a third view illustrating the touch panel control command of FIG. 33.

FIG. 37 is a fourth view illustrating the touch panel control command of FIG. 33.

DETAILED DESCRIPTION OF PREFERRED EMBODIMENTS

Figure 1:
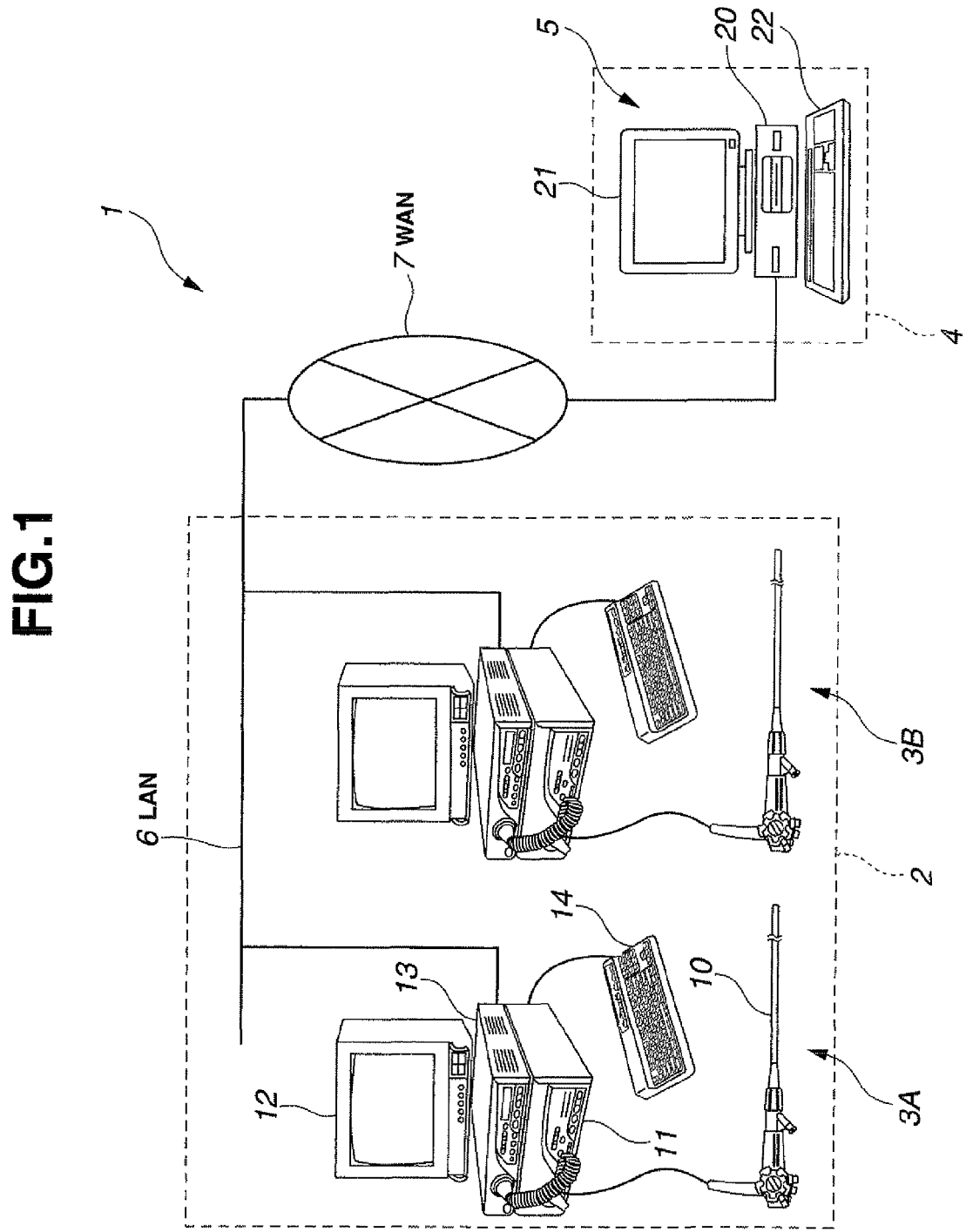
FIG. 1 is a configuration diagram showing a configuration of an endoscope system according to a first embodiment of the present invention.
Figure 2:
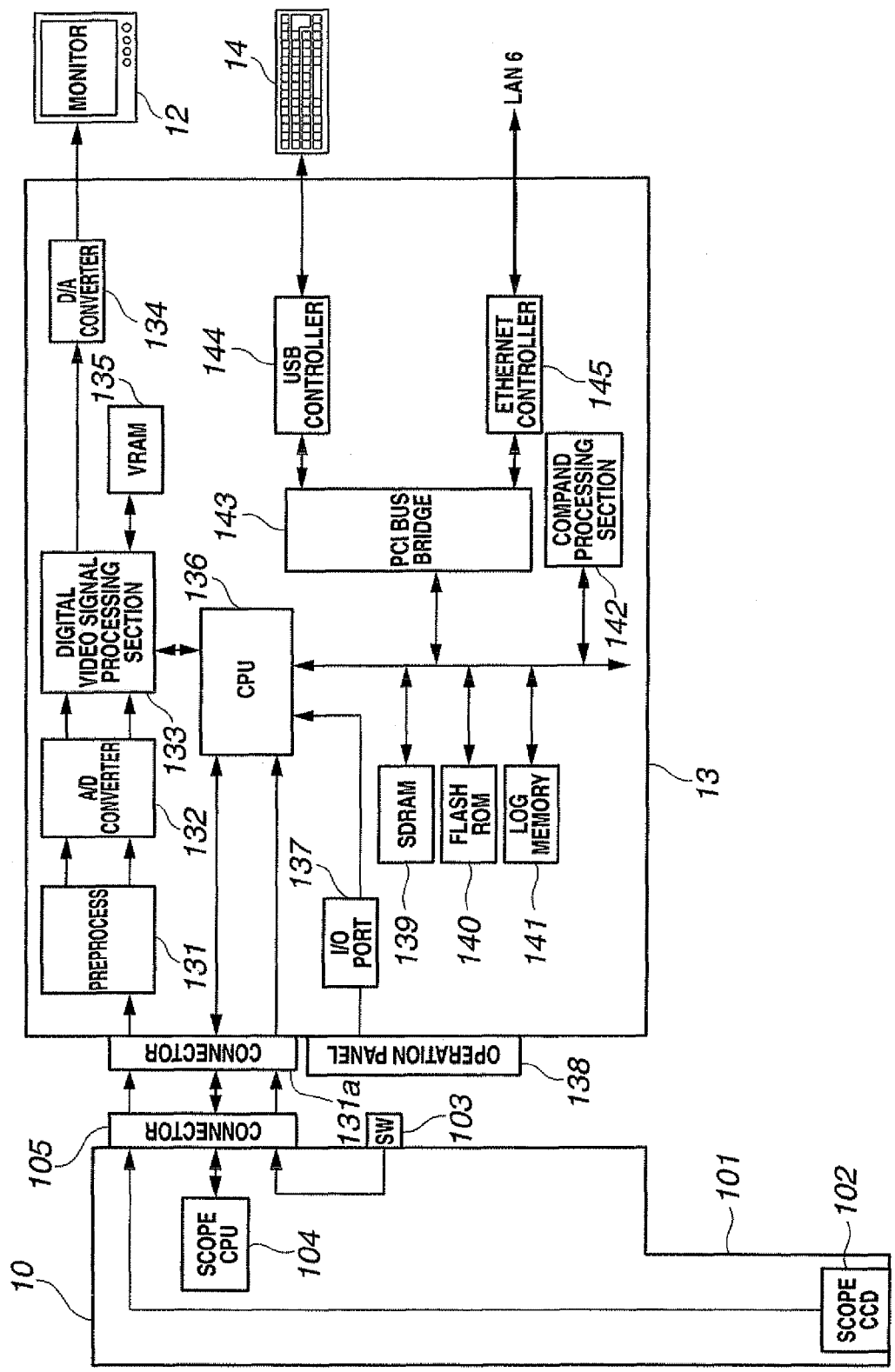
FIG. 2 is a block diagram showing a configuration of a CCU of FIG. 1.
Figure 3:
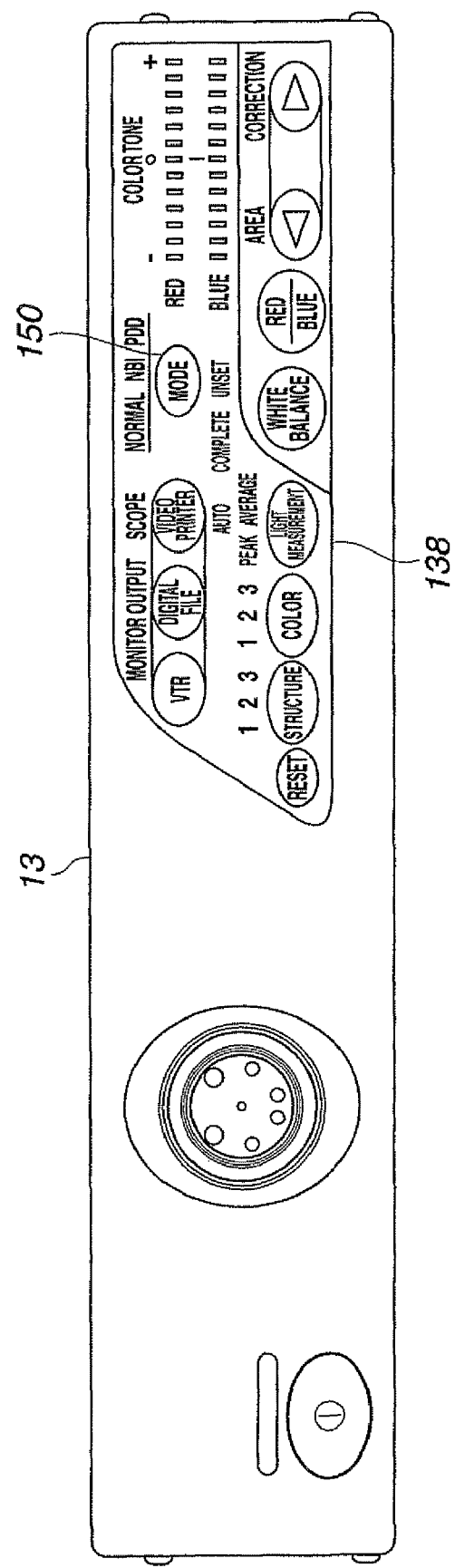
FIG. 3 is a view showing a configuration of an operation panel of FIG. 2.
Figure 4:
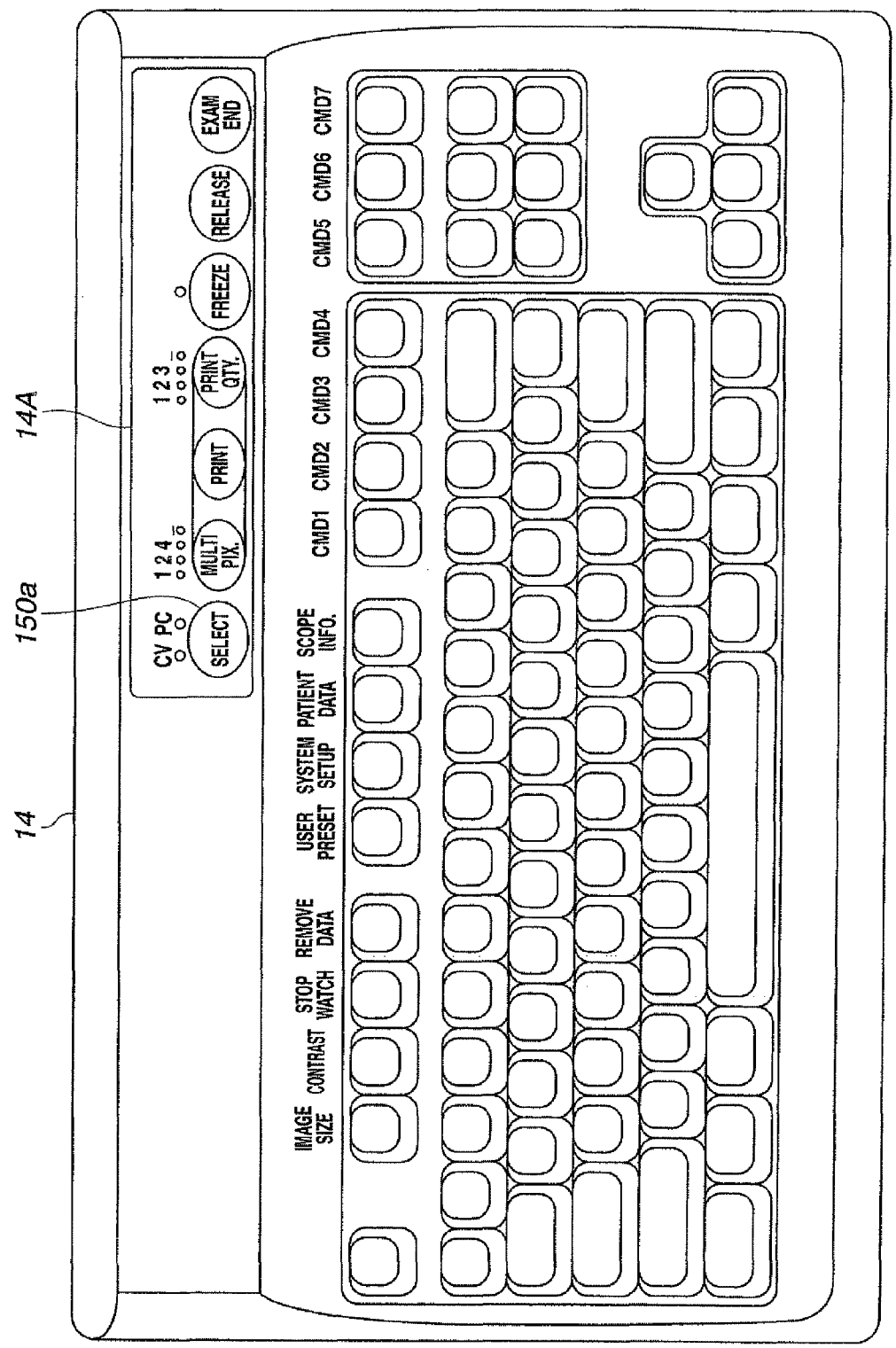
FIG. 4 is a view showing a configuration of a keyboard of FIG. 2.
Figure 14:
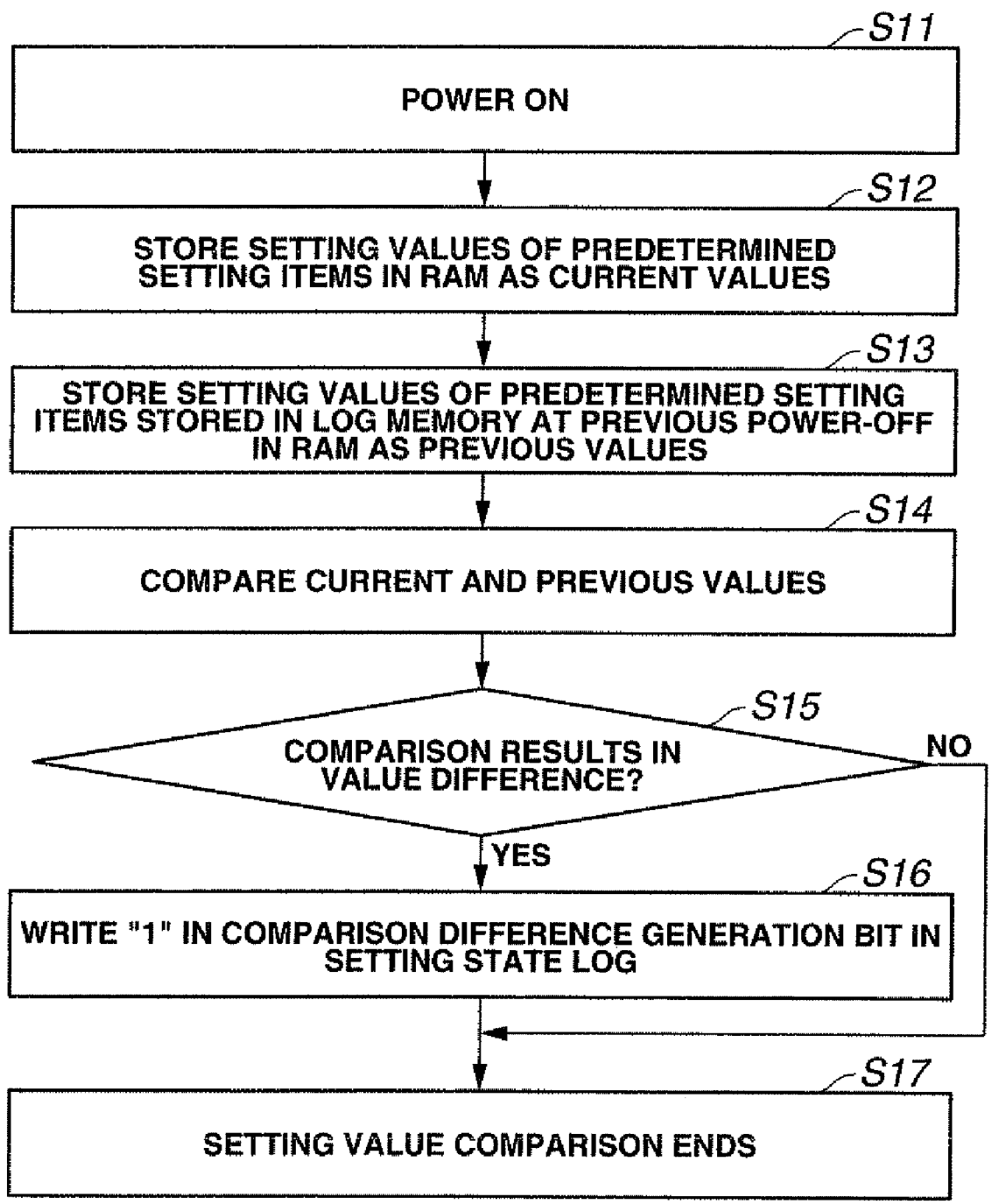
FIG. 14 is a flow chart showing a flow of a processing for checking the setting state of the system log data.
Figure 15:
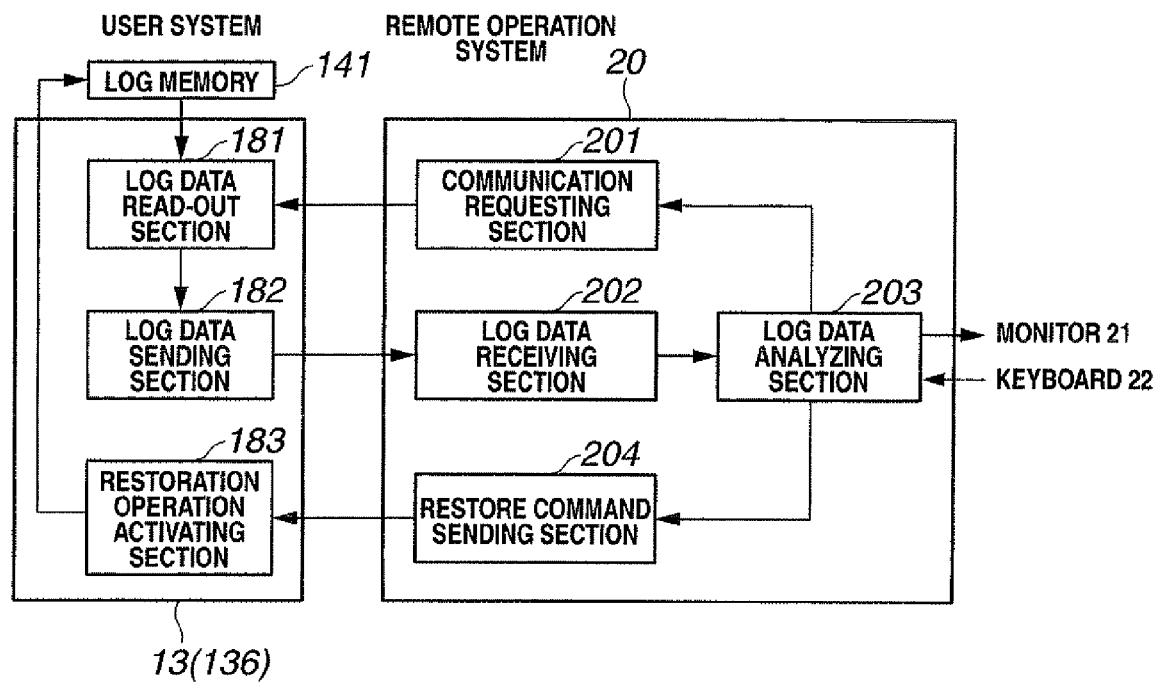
FIG. 15 is a function block diagram showing a function of the endoscope system of FIG. 1.
Figure 16:
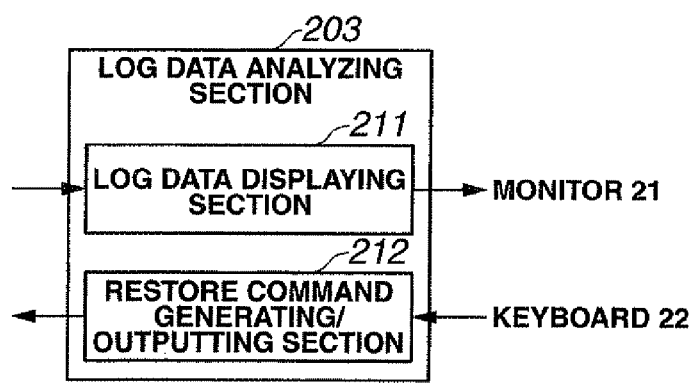
FIG. 16 is a function block diagram showing a function of a log data analyzing section of FIG. 15.
Figure 17:
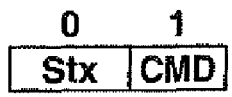
FIG. 17 is a view showing a data format configuration of a restore command generated by the log data analyzing section of FIG. 16.
Figure 18:
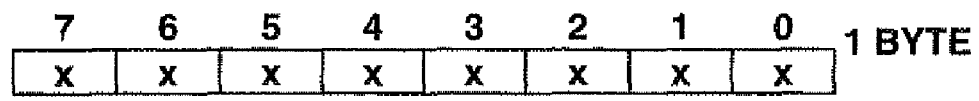
FIG. 18 is a view showing a data configuration of a command body CMD of the restore command of FIG. 17.
Figure 20:
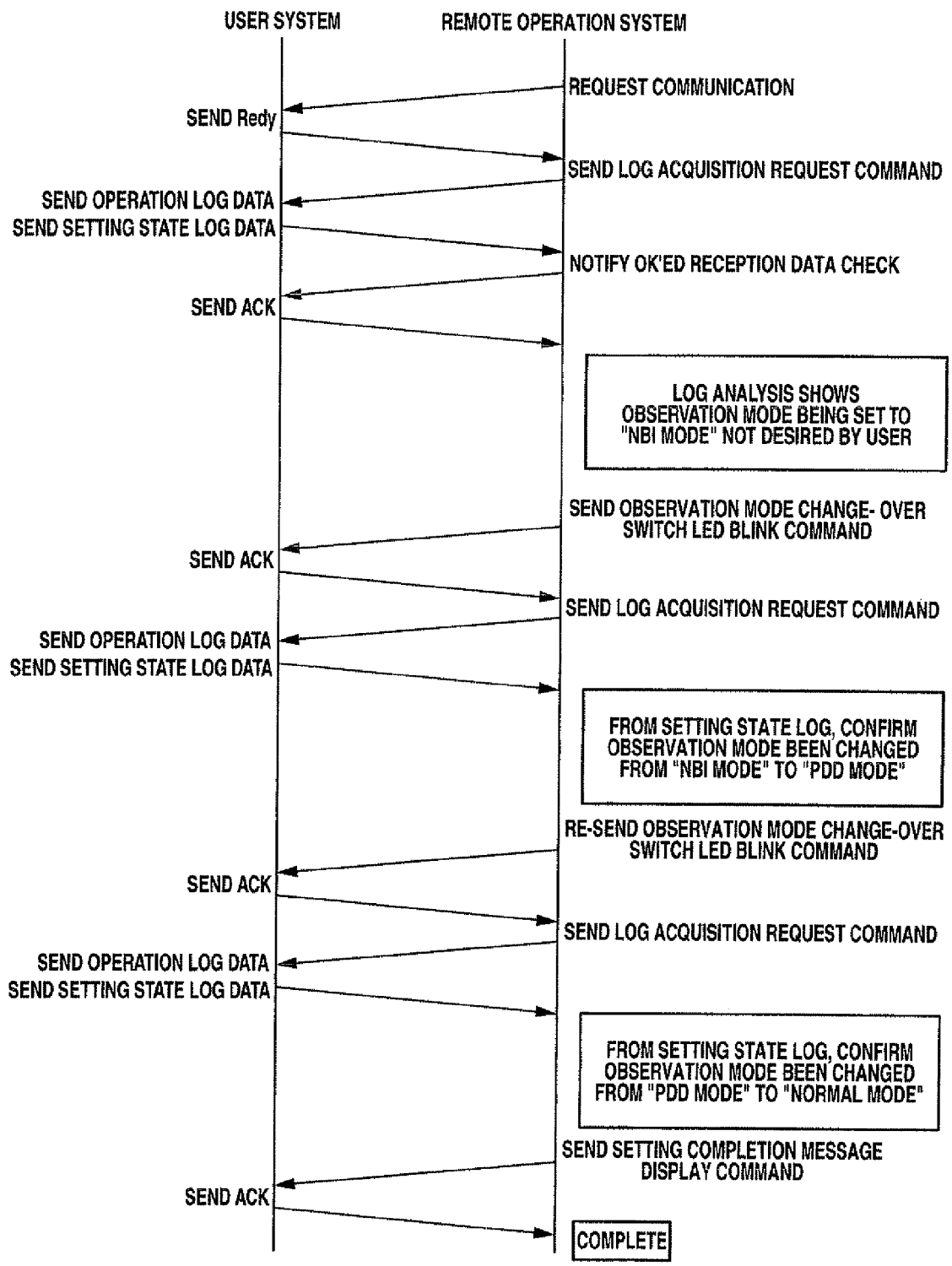
FIG. 20 is a view illustrating operation transition of the endoscope system of FIG. 1.
Figure 21:
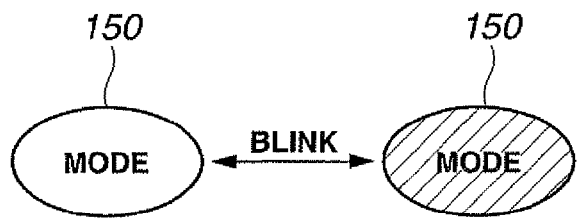
FIG. 21 is a view illustrating a manner of indication of a setting switch in the operation transition of FIG. 20.
Figure 22:
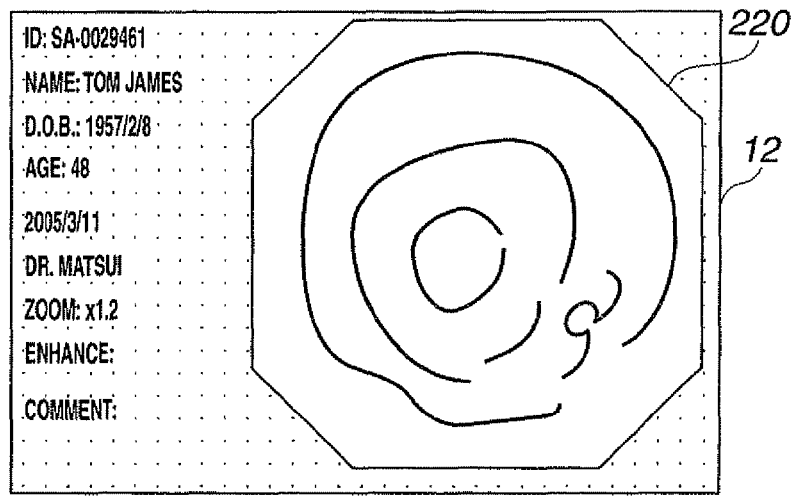
FIG. 22 is a view of an endoscopic image displayed on a monitor 12 of FIG. 1.
Figure 23:
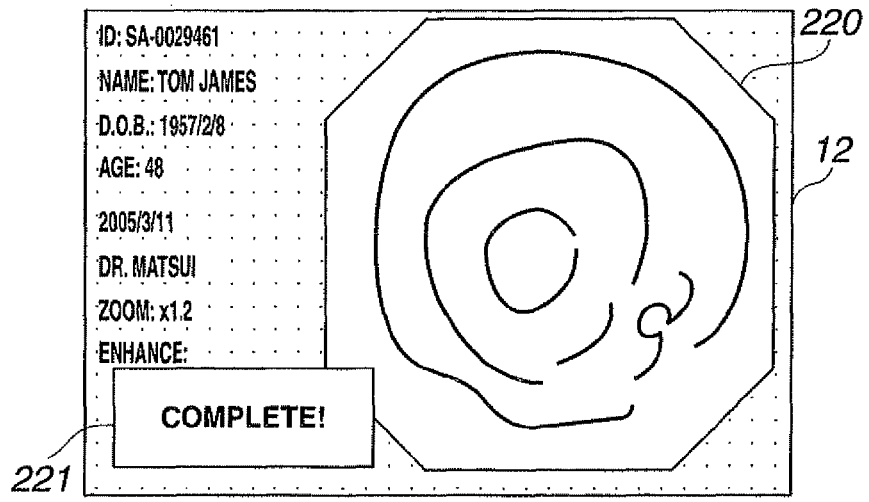
FIG. 23 is a view showing a message indicating completion of setting which is superposed on the endoscopic image of FIG. 22.
Figure 25:
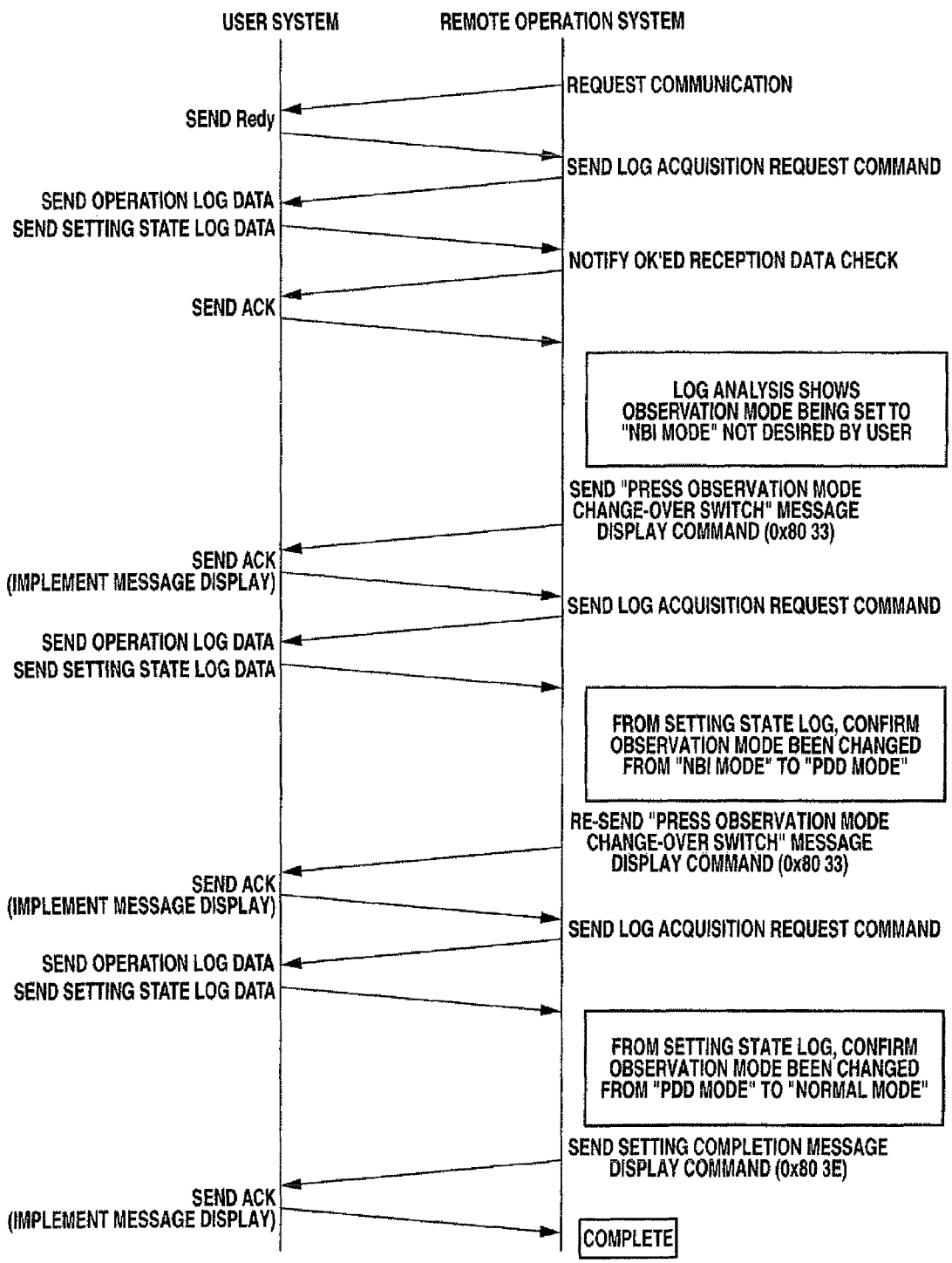
FIG. 25 is a view illustrating a modification example of the operation transition of the endoscope system of FIG. 1.
Figure 26:
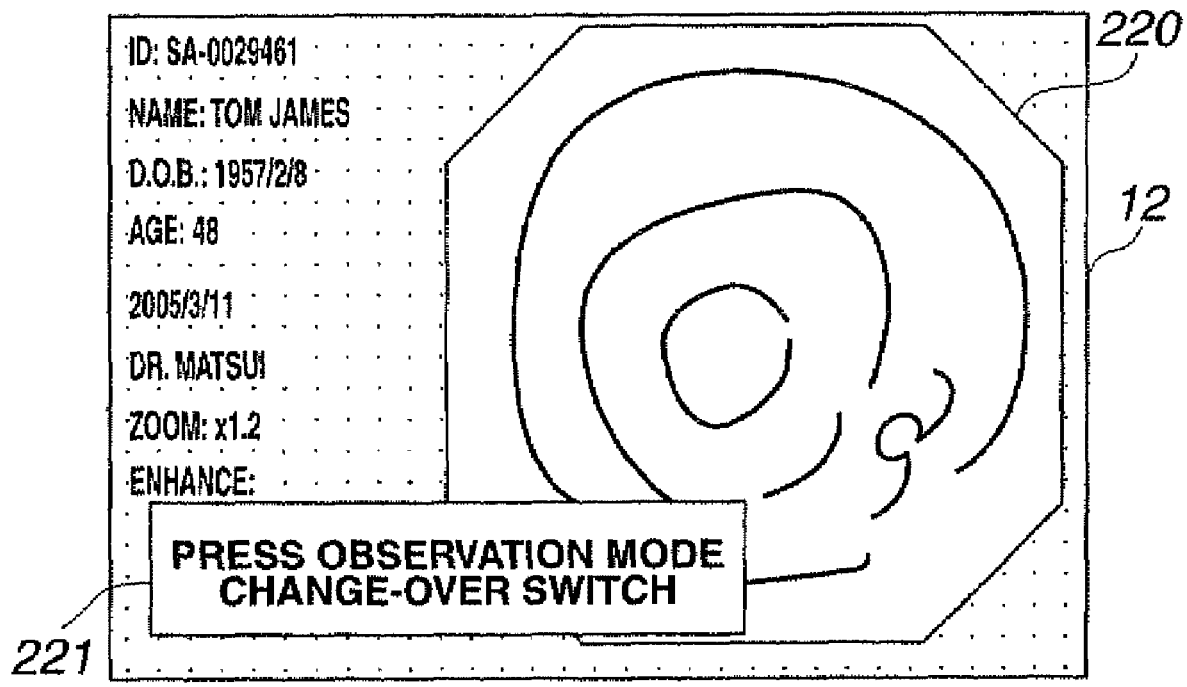
FIG. 26 is a view showing a message indicating the content of a restore command which is superposed on the endoscopic image of FIG. 22.

Referring to the drawings, embodiments of the present invention are described below.
First Embodiment
FIGS. 1 to 26 relate to a first embodiment of the present invention. FIG. 1 is a configuration diagram showing a configuration of an endoscope system. FIG. 2 is a block diagram showing a configuration of a CCU of FIG. 1. FIG. 3 is a view showing a configuration of an operation panel of FIG. 2. FIG. 4 is a view showing a configuration of a keyboard of FIG. 2. FIG. 5 is a view showing a data format configuration of operation log data to be stored in a log memory of FIG. 2. FIG. 6 is a first view showing a specific data configuration of the data format configuration of FIG. 5. FIG. 7 is a second view showing a specific data configuration of the data format configuration of FIG. 5. FIG. 8 is a third view showing a specific data configuration of the data format configuration of FIG. 5. FIG. 9 is a fourth view showing a specific data configuration of the data format configuration of FIG. 5. FIG. 10 is a fifth view showing a specific data configuration of the data format configuration of FIG. 5. FIG. 1 is a view showing a data format configuration of setting state log data to be stored in the log memory of FIG. 2. FIG. 12 is a view showing a specific data configuration of the data format configuration of FIG. 11. FIG. 13 is a flow chart showing a flow of a processing for storing of system log data in the CCU of FIG. 2. FIG. 14 is a flow chart showing a flow of a processing for checking the setting state of the system log data. FIG. 15 is a function block diagram showing a function of the endoscope system of FIG. 1. FIG. 16 is a function block diagram showing a function of a log data analyzing section of FIG. 15. FIG. 17 is a view showing a data format configuration of a restore command generated by a log data analyzing section of FIG. 16. FIG. 18 is a view showing a data configuration of a command body CMD of the restore command of FIG. 17. FIG. 19 is a view illustrating the content of the restore command of FIG. 17. FIG. 20 is a view illustrating operation transition of the endoscope system of FIG. 1. FIG. 21 is a view illustrating a manner of indication of a setting switch in the operation transition of FIG. 20. FIG. 22 is a view of an endoscopic image displayed on a monitor 12 of FIG. 1. FIG. 23 is a view showing a message indicating completion of setting which is superposed on the endoscopic image of FIG. 22. FIG. 24 is a view illustrating the content of a modification example of the restore command of FIG. 17. FIG. 25 is a view illustrating a modification example of the operation transition of the endoscope system of FIG. 1. FIG. 26 is a view showing a message indicating the content of a restore command which is superposed on the endoscopic image of FIG. 22.
Configuration As shown in FIG. 1, an endoscope system 1 of this embodiment includes: a plurality of endoscope apparatuses 3A, 3B each serving as a signal processing system, which are provided in a medical facility 2 which is a user system; and a support system 5 provided in a support facility 4 which is a remote operation system located away from the medical facility 2. The plurality of endoscope apparatuses 3A, 3B and the support system 5 are communicatably connected to each other via LAN (Local Area Network) 6 and WAN (Wide Area Network) 7.

The endoscope apparatus 3A includes an endoscope 10 for picking up images of an intra-body cavity observation region; a light source apparatus 11 for supplying illumination light to the endoscope 10; and a camera control unit (hereinafter "CCU") 13 for displaying an observation region image picked up by the endoscope IO on a monitor 12 as an endoscopic image. The CCU 13 is connected with a keyboard 14 which is used to input data. The endoscope apparatus 3B also has the same configuration as the endoscope apparatus 3A.

The support system 5 is configured by a personal computer (PC), etc., which includes a PC main body 20, monitor 21, and keyboard 22.

As shown in FIG. 2, the CCU 13 is detachably connectable via a connector 131 a with a connector 105 of the endoscope 10.

The endoscope 10 has an insertion portion 101 to be inserted into the body cavity. In a distal end of the insertion portion 101, there are included a scope CCD 102 for image pick-up of the observation region; a switch 103 for instructing various operations (such as bending operation and release operation) which is provided on an operation portion at a proximal end of the insertion portion 101; a scope CPU 104 for controlling each part of the endoscope 10 and managing endoscope type information, etc., which is provided in the operation portion at the proximal end of the insertion portion 101.

The CCU 13 includes a preprocess section 131 which is inputted with an image-pickup signal from the scope CCI) 102 of the endoscope 10 via the connectors 105 and 131*a*. The preprocess section 131 is a processing section for executing known analogue processings including noise removal processing, correlative double sampling processing, and white balance processing, on the image-pickup signal from the scope CCLD 102.

The analogue signal processed by the preprocess section 131 is converted to a digital signal by an A/D conversion section 132 and inputted to a digital video signal processing section 133 in the subsequent stage.

The digital video signal processing section 133 executes known image (video) digital processings (such as color tone correction, γ correction, and expansion/reduction processing) on the digital signal from the A/D conversion section 132 using a VRAM 135, etc. The digitally processed digital video signal is converted to an analogue signal by a D/A conversion section 134. This converted analogue signal is displayed on the monitor 12 as an endoscopic image.

The CCU 13 further includes a CPU 136. The CPU 136 sends/receives data to/from the scope CPU 104 and receives inputs of instruction signals from the switch 103 of the endoscope via the connectors 105 and 131.

The CPU 136 is connected to the light source apparatus 11 (see FIG. 1) via the connector 131 *a* and sends/receives information to/from a light source CPU (not shown) in the light source apparatus 11. The CPU 136 can thereby acquire light source history information (log data) including setting information of the light source apparatus 11 such as, e.g., light adjustment information and use-history of the light source lamp (not shown).

The CPU 136 is further connected to the keyboard 14 via a PCI bus bridge 143 and a USB controller 144. The CPU 136 can thus receive information inputted using the keyboard 14 and have various information displayed on the keyboard 14. The CCU 13 is furthermore connected to the LAN 6 (see FIG. 1) via the PCI bus bridge 143 and an Ethernet (registered trademark) controller 145.

The CPU 136 is connected to the PCI bus bridge 143 and the Ethernet controller 145 via an internal bus.

The CPU 136 is also connected to an SDRAM 139, FLASH ROM 140, log memory 141 and compand processing section 142 via the internal bus.

The CPU 136 controls, e.g., the compand processing section 142 using the SDRAM 139, performs a compand processing on the digital image processed by the digital video signal processing section 133, and records the resultant image into the FLASH ROM 140.

The CPU 136 moreover saves and manages in the log memory 141, as system log data, history information (log data) on settings and operations made with the operation panel 138, the keyboard 14, etc.; information on various settings/operations of the endoscope 10 (acquired from the scope CPU 104 of the endoscope 10); or information on various settings/operations of the light source apparatus 11, which is produced in various processings in parts of the CCU 13.

Conventionally, the system log data has generally been stored and saved in the log memory 141 to be used by the CPU 136 to manage the system settings when activating the endoscope apparatus, as well as by the user to use the inspection flow as data for checking the executed procedures and for education after completion of an inspection with the endoscope apparatus.

As shown in FIG. 3, the operation panel 138 is provided on a front surface of the CCU 13. On the operation panel 138, various setting switches are provided. For example, a mode switch 150 shown in FIG. 3 is a switch for selecting one of observation modes, which are processable by the CCU 13. In this embodiment, the CCU 13 can select normal observation mode (Normal) by visible light, first special observation mode (NBI) by narrow band light, or second special observation mode (PDD) by fluorescent light, through operation of the mode switch 150. The mode setting state is sent to the CPU 136 via an I/O port 137.

As shown in FIG. 4, the keyboard 14 includes above a normal (known) key input portion, a display panel portion 14A on which various states can be directly inputted and displayed. The setting state of the display panel portion 14A is sent to the CPU 136 via the USB controller 144. The manner of indication of the mode switch 150*a* on the display panel portion 14A is controllable by the CPU 136 via the USB controller 144, as the manner of indication of the operation panel 138 is.

Next is described system log data that is saved in the log memory 141 by the CPU 136.

The system log data includes operation log data and setting state log data. The CPU 136 stores the operation log data and setting state log data in a predetermined area of the log memory 141.

Specifically, the operation log data has a data format configuration as shown in FIG. 5, including Stx, Item, MO, DD, HH, MT, SEC, Len and Data.

Stx is header data as shown in FIG. 6. Item is data extension (see FIG. 10) for identifying data classification (setting/operation classification) as shown in FIG. 7. MO (month), DD (date), HH (hour), MT (minute) and SEC (second) are time stamp data to show the time of day when an operation is performed, as shown in FIG. 8. Len shows the data length of the operation log data as shown in FIG. 9. Further, Data is the data body of the operation log data, having a data configuration which is classified by Item (extension), as shown in FIG. 10.

The setting state log data also includes Stx, Item, MO, DD, HH, MT, SEC, Len and Data, as shown in FIG. 11. Data configuration of Stx, Item, MO, DD, HH, MT, SEC and Len is the same as of the operation log data. Data is the data body of the setting state log data, having a data configuration which is classified by Item (extension) as shown in FIG. 12.

Action

An action of this embodiment thus configured is described below.

As shown in FIG. 13, when power is turned on in step S1, then in step S2 the CPU 136 of the CCU 13 checks whether or not the setting state of each part of the endoscope apparatus has been changed.

If the checking results in "Yes", then in step S3 the CPU 136 determines whether or not the state change is based on a predetermined function operation executed by the user. If the determination results in "No", then the process proceeds to step S4.

In step S4, the CPU 136 determines whether or not the state change is based on a predetermined setting change executed by the user. If the determination results in "No", then the process proceeds to step S5. In step S5, log is not generated for the system log data. The process then returns to step S2.

If in step S3 the determination results in "Yes", then in step S6 the CPU 136 newly generates operation log data according to the operation log data format (see FIG. 5) of the system log data. In step S7, the newly generated operation log data is stored in a predetermined area of the log memory 141. The process then returns to step S2.

If in step S4 the determination results in "Yes", then in step S8 the CCU 13 newly generates setting state log data according to the setting state log data format (see FIG. 11) of the system log data. In step S9, the newly generated setting state log data is stored in a predetermined area of the log memory 141. The process then returns to step S2.

In this embodiment, when the endoscope apparatus 3A completes an inspection, the CPU 136 stores each of actual setting values made last into the FLASH ROM 140 before completing the processing.

The CPU 136 is thus enabled to execute, upon power-on, the check-processing for checking the setting state of the system log data as shown in FIG. 14 before the above processing (FIG. 13).

Specifically, as shown in FIG. 14, upon power-on in step S11, then in step S12 the CPU 136 stores setting values of setting items stored in the FLASH ROM 140 (setting values of previous settings made last) into the SDRAM 139 as current values.

Next in step S13, the CPU 136 stores setting values of setting items of the setting state log data (last setting values in operational history) stored in the log memory 141, into the SDRAM 139 as previous values.

Subsequently in step S14, the CPU 136 compares the current and previous values. In step S15, the CPU 136 determines if the comparison results in any difference between the current and previous values. If the result is "No", then the process proceeds to step S17.

If step S15 determines the result is "Yes", then in step S16 the CPU 136 writes "1" into a comparison difference generation bit in the setting state log data of the system log data (by default, the comparison difference generation bit is set to "0"). In step S17, the setting value comparison completes, completing the check-processing.

Thus, executing this check-processing allows the setting state log data to have information of the comparison difference generation bit, in addition to the data shown in FIG. 5.

As shown in FIG. 15, the endoscope system 1 of this embodiment includes two mechanism blocks as system functions: the user system (the medical facility 2) and the remote operation system (the support facility 4).

That is, as shown in FIG. 15, the user system (the medical facility 2) includes: a log data read-out section 181 for reading out the setting state log data stored in the log memory 141; a log data sending section 182 for sending the setting state log data which is read out to the support system 5 of the remote operation system (the support facility 4); and a restoration operation activating section 183 for receiving a restore command from the support system 5 of the remote operation system (the support facility 4) and activating a restoration operation. The restoration operation by the restoration operation activating section 183 will be detailed later.

The log data read-out section 181, the log data sending section 182, and the restoration operation activating section 183 are realized in a software manner by a program executed by the CPU 136.

On the other hand, the remote operation system (the support facility 4) includes: a log data receiving section 202 for receiving the setting state log data from the log data sending section 182 of the user system (the medical facility 2); a log data analyzing section 203 for analyzing the received setting state log data; a communication requesting section 201 for requesting the log data read-out section 181 of the user system (the medical facility 2) to send the setting state log data, based on the control by the log data analyzing section 203; and a restore command sending section 204 for sending the restore command which is based on the analysis result of the log data analyzing section 203 to the restoration operation activating section 183 of the user system (the medical facility 2).

The communication requesting section 201, the log data receiving section 202, the log data analyzing section 203, and the restore command sending section 204 are realized in a software manner by a program executed by a CPU (not shown) of the support system 5.

As shown in FIG. 16, the log data analyzing section 203 includes a log data displaying section 211 for displaying the setting state log data on the monitor 21, and a restore command generating/outputting section 212 for generating and outputting a restore command based on input from the keyboard 22.

In this embodiment, the log data analyzing section 203 is configured to cause the setting state log data to be displayed on the monitor 21 of the support system 5, so that the maintenance worker can operate the support system 5 to analyze the log data and, based on the analysis result, input countermeasure information to the support system 5 using the keyboard 22. The restore command generating/outputting section 212 generates a restore command based on the countermeasure information. The generated restore command is then outputted to the user system (the medical facility 2).

An LED control instruction command as an exemplary restore command has a data format configuration including Stx and CMD, as shown in FIG. 17. Stx is header data (see FIG. 6). CMD is 1-byte data as shown in FIG. 18 and is accordingly represented as the commands as shown in FIG. 19.

On receiving the LED control instruction command, the user system (the medical facility 2), i.e., the CPU 136, performs, e.g., turn-on control of the LED in the mode switch 150 on the operation panel 138.

Now referring to FIG. 20, an operational transition of the endoscope system of this embodiment based on a specific restore command is described. If an instrument setting is abnormal (in abnormal state) at the time of inspection, the user attempts to restore the instrument setting. However, the wide variety of setting items and the user engagement with the inspection disables the user to allot any time to analyze the setting abnormality. To counter such disability, the user system requests the remote operation system to analyze the setting abnormality. In response the remote operation system starts analyzing this abnormality using the setting state log data.

In this analysis request, for example the following processings are performed through communication, telephone, etc. Conceivable instrument abnormality states include those due to simple erroneous setting by the user, unsuitable setting for the observation mode, and abnormal instrument device. The remote operation system analyzes these abnormality states using the setting state log data.

Transition 1

The remote operation system (the support facility 4) requests communication to the user system (the medical facility 2). The user system sends "Redy" to the remote operation system to establish communication between the user system and the remote operation system.

Transition 2

On confirming the established communication, the remote operation system sends to the user system a log acquisition request command which requests the setting state log data, On receiving the log acquisition request command, the user system sends the setting state log data to the remote operation system according to the request.

Transition 3

The remote operation system checks the received setting state log data by, e.g., check sum, etc., and sends an "OK" command which indicates normal reception to the user system. Upon receiving the "OK" command, the user system returns "ACK" to the remote operation system, thereby completing the sending/receiving of the setting state log data between the two systems.

Analysis 1

The remote operation system causes the setting state log data to be displayed on the monitor 21, which permits the maintenance worker operating the support system 5 to analyze the log data. For example, on finding that "the observation mode is set to "NBI mode" instead of the "normal observation mode" the user desires, then the maintenance worker inputs the analysis content using the keyboard 22.

Transition 4

In the remote operation system, based on the inputted analysis content, the support system 5 generates a restore command, i.e., a command (0x0E) for blinking the LED of the observation mode change-over switch of the LED control instruction command. The support system 5 then sends the generated command to the user system. On receiving the LED control instruction command (command for blinking the LED of the observation mode change-over switch), the user system returns "ACK" to the remote operation system.

User Operation 1

The LED control instruction command (command for blinking the LED of the observation mode change-over switch) blinks the mode switch 150, which is the observation mode change-over switch, on the operation panel 138 of the user system as shown in FIG. 21. The blinking notifies an erroneous observation mode setting to the user, who in response operates the mode switch 150.

This user operation of the mode switch 150 is recorded as new log data in the setting state log data in the log memory 141.

In this embodiment, the mode switch 150 is operated to allow for toggle-like switching of three observation modes: "normal observation mode"→"NBI (narrow band observation) mode"→"PDD (fluorescent light observation) mode"→"normal observation mode" and the same.

In this "user operation 1" section, however, the observation mode is changed from the NBI mode to PDD mode but is not yet changed to the "normal observation mode" that the user desires.

Transition 5

The remote operation system again sends to the user system the log acquisition request command that requests the setting state log data. The user system receives the log acquisition request command, and sends the setting state log data to the remote operation system in response to the request.

Analysis 2

In the remote operation system, the setting state log data is displayed on the monitor 21, which permits the maintenance worker operating the support system 5 to analyze the log data. On finding that, e.g., "the observation mode setting has been changed from "NBI mode" to "PDD mode", the maintenance worker inputs the analysis content using the keyboard 22.

Transition 6

In the remote operation system, the support system 5 again generates, based on the inputted analysis content, a restore command, i.e., a command (0x0E) for blinking the LED of the observation mode change-over switch of the LED control instruction command. The support system 5 then sends the generated command to the user system. On receiving the LED control instruction command (command for blinking the LED of the observation mode change-over switch), the user system returns "ACK" to the remote operation system.

User Operation 2

The LED control instruction command (command for blinking the LED of the observation mode change-over switch) blinks the mode switch 150, which is the observation mode change-over switch, on the operation panel 138 of the user system as shown in FIG. 21. The blinking notifies the user that there is still an erroneous observation mode setting. The user in response operates the mode switch 150.

This user operation of the mode switch 150 is recorded as new log data in the setting state log data in the log memory 141.

By this "user operation 2", the observation mode is changed to the "normal observation mode" that the user desires.

Transition 7

The remote operation system again sends to the user system the log acquisition request command which requests the setting state log data. On receiving the log acquisition request command, the user system sends the setting state log data to the remote operation system in response to the request.

Analysis 3

In the remote operation system, the setting state log data is displayed on the monitor 21, which permits the maintenance worker operating the support system 5 to analyze the log data. On finding that, e.g., "the observation mode setting has been changed from "PDD mode" to "normal observation mode" the user desires, the maintenance worker inputs "analysis complete" using the keyboard 22.

Transition 8

In the remote operation system, the support system 5 generates a setting-complete message display command based on the analysis complete input. The support system 5 sends the generated command to the user system. On receiving this setting-complete message display command, the user system returns "ACK" to the remote operation system.

It is noted that the user system which has received the message display command can cause a message window 221 reading "Complete!" as shown in FIG. 23 to be superposedly displayed on the monitor 12 displaying, e.g., an endoscopic image 220 as shown in FIG. 22. The user is thus enabled to visually recognize the completion of setting.

It is further noted that if the check-processing described in FIG. 14 indicates that the comparison difference generation bit in the setting state log data is set to "1", then the maintenance worker can determine this setting as an abnormal state due to an instrument device abnormality. The maintenance worker notifies the user system of the instrument abnormality, contacting to accept repairing of the instrument.

Effect

As mentioned above, this embodiment can perform restoration from an abnormal setting of the endoscope apparatus by sending the setting state log data, which has conventionally and generally been stored in the log memory 141, from the user system to the remote operation system, and furthermore a restore command based on the setting state log data from the remote operation system to the user system. It is thus enabled to easily monitor system instrument abnormalities and set the instruments into a state appropriate for the observed situation, without any specific need to provide means for monitoring each instrument of the endoscope apparatus.

It should be noted that the restore command is not limited to the LED control instruction command shown in FIG. 19. Alternatively the command may be as CMD, e.g., a message display command which is superposely displayed on the monitor 12 displaying the endoscopic image 220, as shown in FIG. 24. In this case, the operational transition of the endoscope system is as shown in FIG. 25. In this transition, instead of the LED control instruction command being sent in Transitions 4 and 6 described in FIG. 20, the message display command is sent from the remote operation system to the user system.

As a result, instead of blinking the LED of the observation mode change-over switch shown in FIG. 21, the message window 221 reading, e.g., "Press the observation mode change-over switch" is superposedly displayed on the endoscopic image as shown in FIG. 26, like the message window 221 reading "Complete!" shown in FIG. 23. Such displaying enables the user to visually recognize an erroneous observation mode setting, achieving the same action and effect as described above in this embodiment.

Second Embodiment

Figure 27:
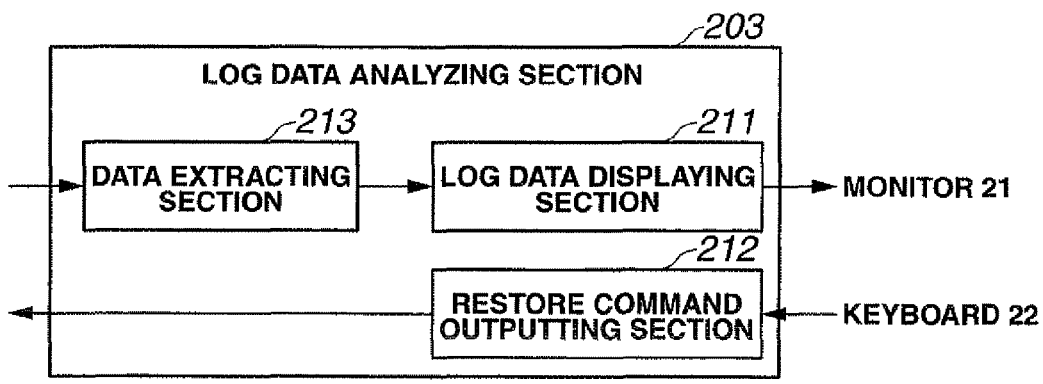
FIG. 27 is a view showing a function configuration of a log data analyzing section according to a second embodiment of the present invention.
Figure 28:
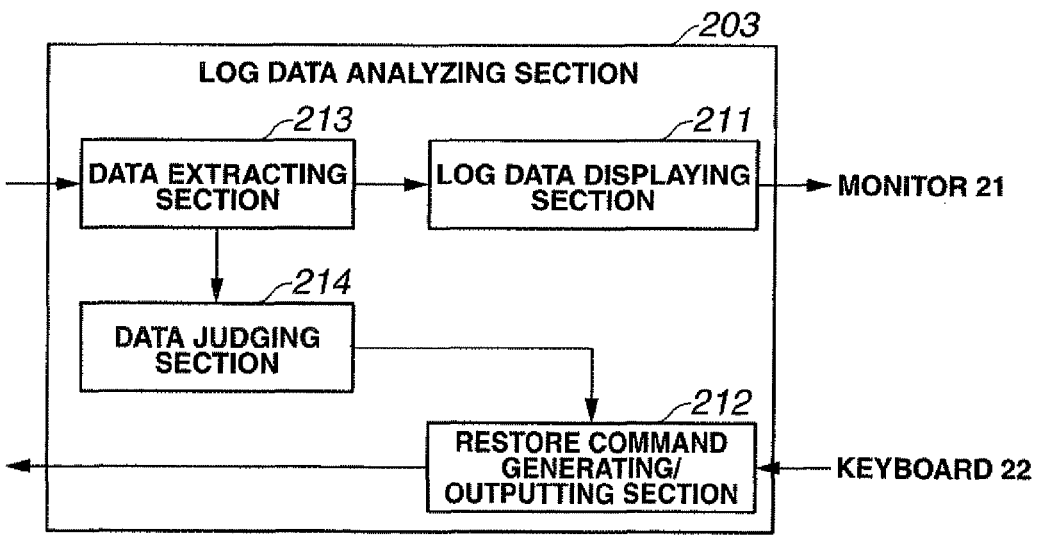
FIG. 28 is a view showing a modification example of the function configuration of the log data analyzing section of FIG. 27.
Figure 29:
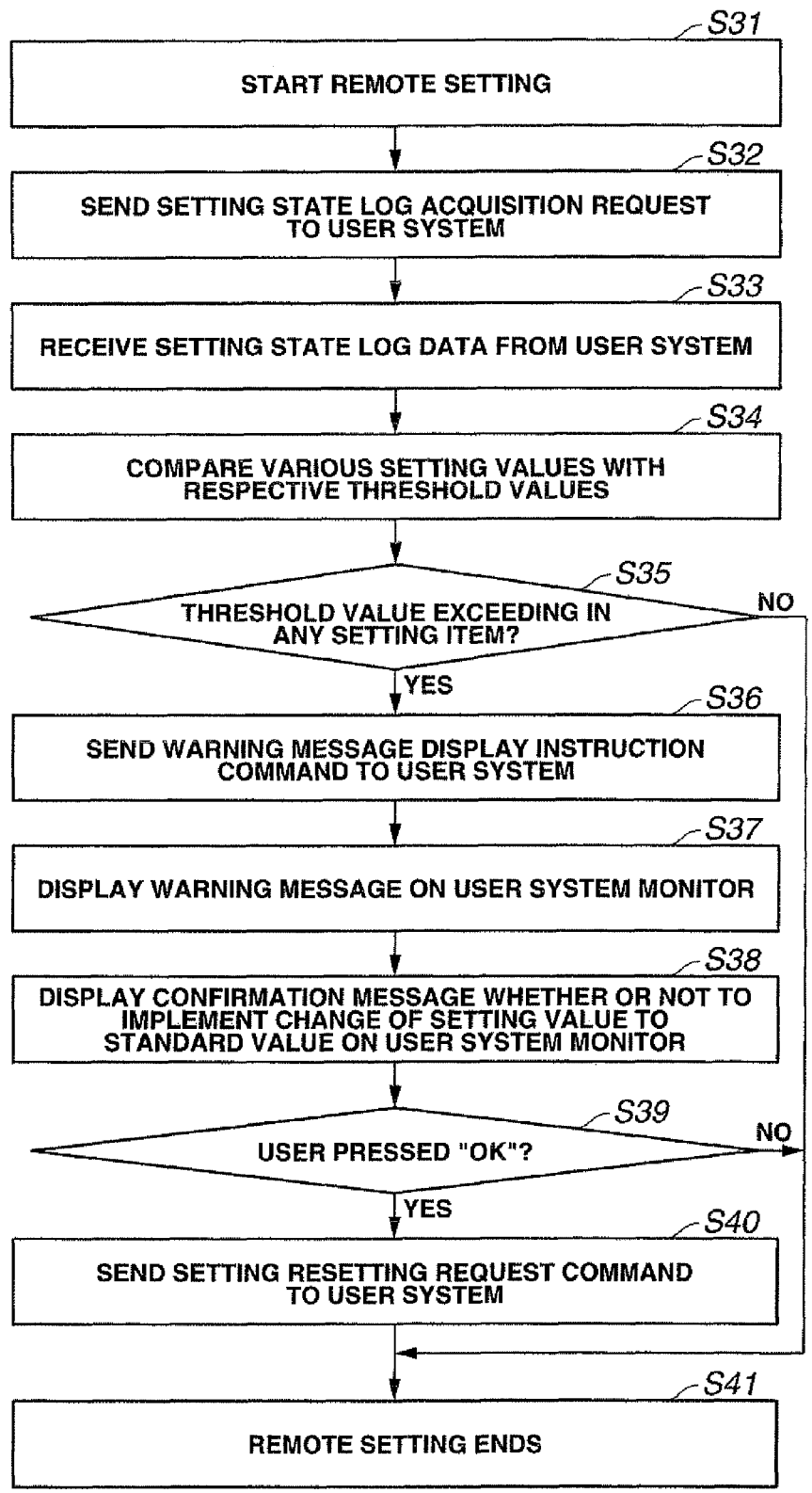
FIG. 29 is a view showing a flow of remote setting processing in a remote operation system by the log data analyzing section of FIG. 27 or 28.
Figure 30:
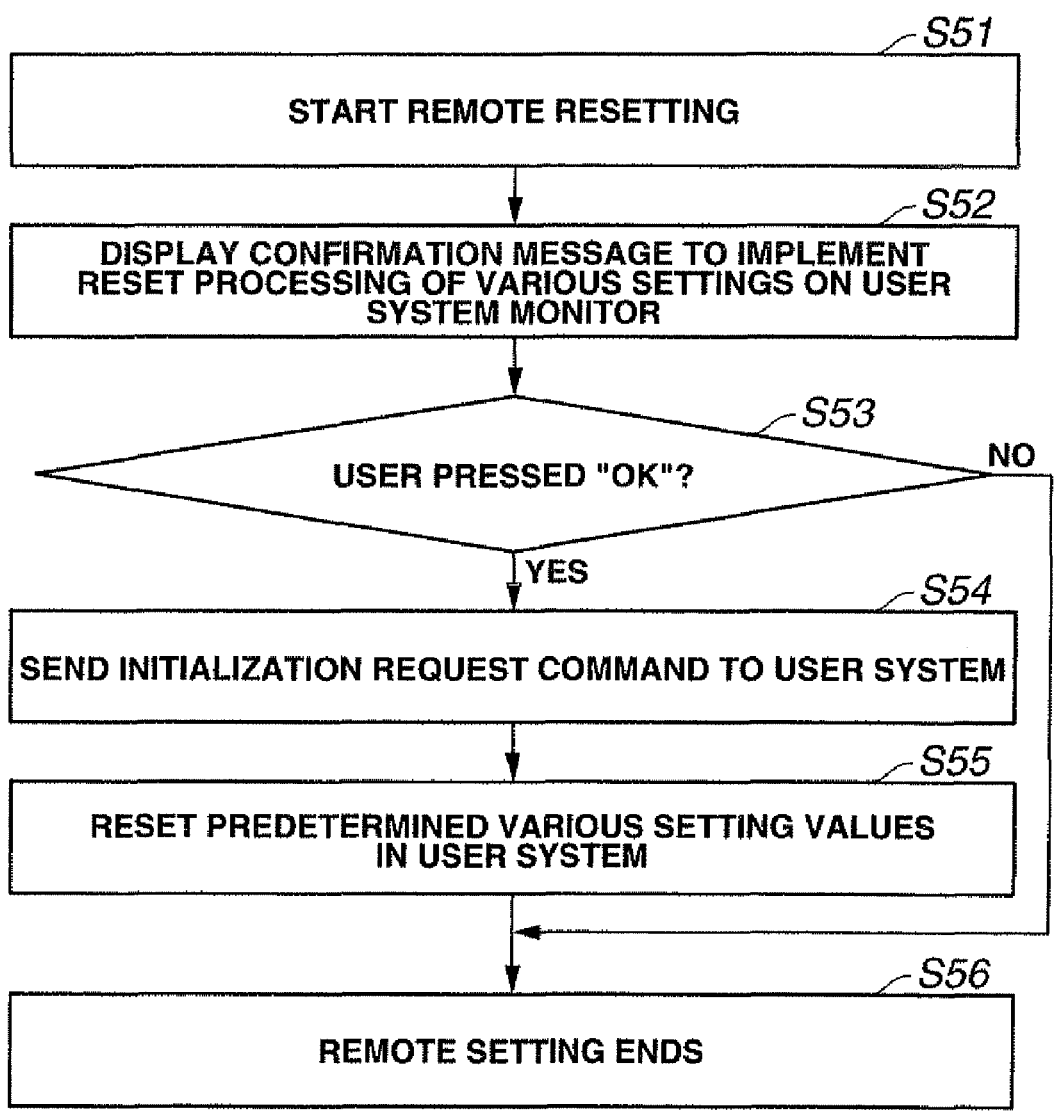
FIG. 30 is a view showing a flow of a remote resetting processing which follows the remote setting processing in the remote operation system of FIG. 29.
Figure 31:
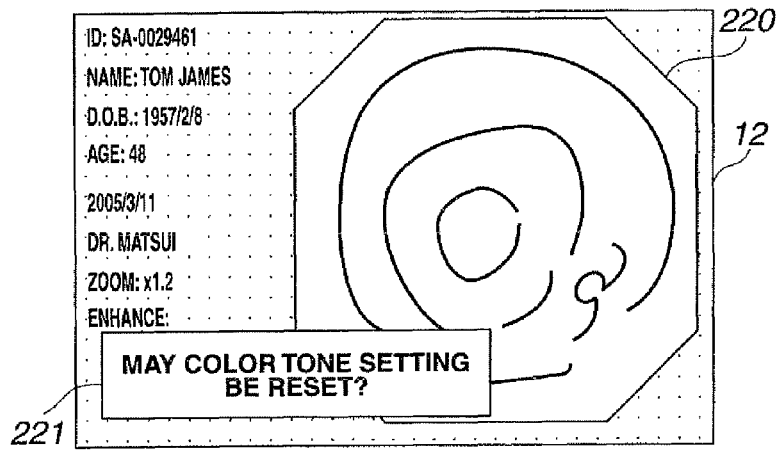
FIG. 31 is a view showing a message which is superposedly displayed on the endoscopic image by the processing of FIG. 30.

FIGS. 27 to 31 relate to a second embodiment of the present invention. FIG. 27 is a view showing a function configuration of a log data analyzing section. FIG. 28 is a view showing a modification example of the function configuration of the log data analyzing section of FIG. 27. FIG. 29 is a view showing a flow of remote setting processing in a remote operation system by the log data analyzing section of FIG. 27 or 28, FIG. 30 is a view showing a flow of a remote resetting processing to follow the remote setting processing in the remote operation system of FIG. 29. FIG. 31 is a view showing a message which is superposedly displayed on the endoscopic image by the processing of FIG. 30.

Since the second embodiment is almost the same as the first embodiment, only differences are described. The same components are denoted with the same reference symbols, omitting their descriptions.

Configuration

In this embodiment, the log data analyzing section 203 has a function configuration which is different from that in the first embodiment. The log data analyzing section 203 of this embodiment includes a data extracting section 213 for extracting setting state log data by comparison with a predetermined threshold value, as shown in FIG. 27. The log data displaying section 211 displays the extraction result of the data extracting section 213 on the monitor 21 together with the setting state log data. In this embodiment, the maintenance worker inputs to instruct the restore command generating/outputting section 212 to generate a reset command for instructing to reset the setting data, based on the extraction result of the data extracting section 213.

It should be noted that the log data analyzing section 203 may further include a data judging section 214 for judging an extraction result of the data extracting section 213 as shown in FIG. 28, so that a reset command based on the judging result of the data judging section 214 is outputted from the restore command generating/outputting section 212.

Action

In this embodiment thus configured, the remote operation system starts a remote setting processing for the user system in step S31 by using the function of the log data analyzing section 203, as shown in FIG. 29.

The remote operation system in step S32 requests the user system for the setting state log data, and in step S33 receives the setting state log data from the user system.

Next in step S34, the remote operation system compares various setting values of the received setting state log data with respective threshold values corresponding to, e.g., the observed situation for each observation mode. In step S35, the remote operation system judges whether or not there is a setting item whose setting value exceeds the threshold value.

It is noted that this judgment is performed by the maintenance worker in the configuration of FIG. 27, and by the data judging section 214 in the configuration of FIG. 28.

If it is judged that there is a setting item whose setting value exceeds the threshold value, then in step S36 the remote operation system sends a warning message display command to the user system. This warning message display command implements in the user system an action similar to the action by the message display command in the first embodiment (see FIG. 24). That is, on receiving the warning message display command, the user system superposedly displays a warning message on the endoscopic image in step S37.

Following the displaying of the warning message, in step S38 the remote operation system further sends to the user system a message display command for displaying an execution confirmation message as to whether or not to change the setting value to the standard value. The execution confirmation message is thus superposedly displayed on the endoscopic image.

Subsequently in step S39, the remote operation system confirms approval of the execution confirmation message from the user system. Having confirmed the approval from the user system, the remote operation system sends a setting resetting request command to the user system in step S40, and completes the remote setting processing in step S41.

Next, a processing for remotely resetting the settings is described. The remote operation system starts the remote resetting processing in step S51. Then in step S52, the system displays in the user system an execution confirmation message as to whether or not to change (reset) the setting value to the standard value.

Specifically, the remote operation system superposedly displays the message window 221 reading, e.g., "May color tone setting be reset?" on the endoscopic image 220 displayed on the monitor 12, as shown in FIG. 31.

If the remote operation system confirms an "OK" input pressed for reset approval from the user system in step 853, then sends an initialization request command to the user system in step S54, resets the predetermined various setting values in the user system in step S55, and completes the remote resetting processing in step S56.

Effect

This embodiment can compare various setting values of the setting state log data with predetermined threshold values that correspond to, e.g., the observed situation for each observation mode and remotely reset the setting values that exceed the threshold values. Accordingly, this embodiment can, in addition to achieving the effect of the first embodiment, more easily and surely set the instrument into a state appropriate for the observed situation.

Third Embodiment

Figure 32:
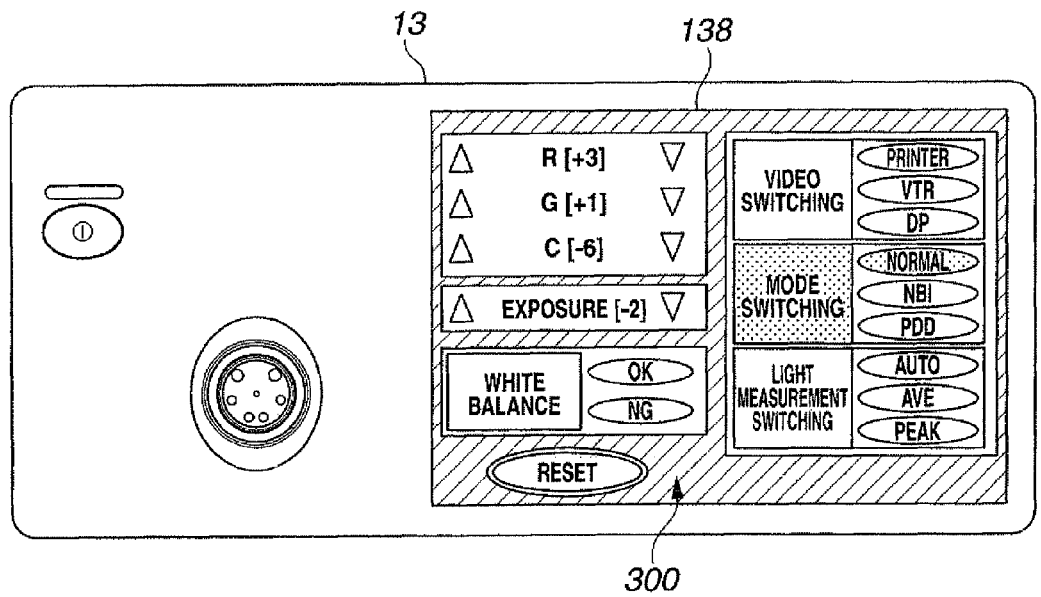
FIG. 32 is a view showing a configuration of an operation panel of a CCU according to a third embodiment of the present invention.
Figure 33:
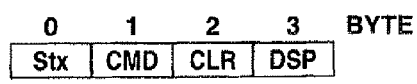
FIG. 33 is a view showing a data format configuration of a touch panel control command for a touch panel of FIG. 32.

FIGS. 32 to 38 relate to a third embodiment of the present invention. FIG. 32 is a view showing a configuration of an operation panel of a CCU. FIG. 33 is a view showing a data format configuration of a touch panel control command for a touch panel of FIG. 32. FIG. 34 is a first view illustrating the touch panel control command of FIG. 33. FIG. 35 is a second view illustrating the touch panel control command of FIG. 33.

Figure 38:
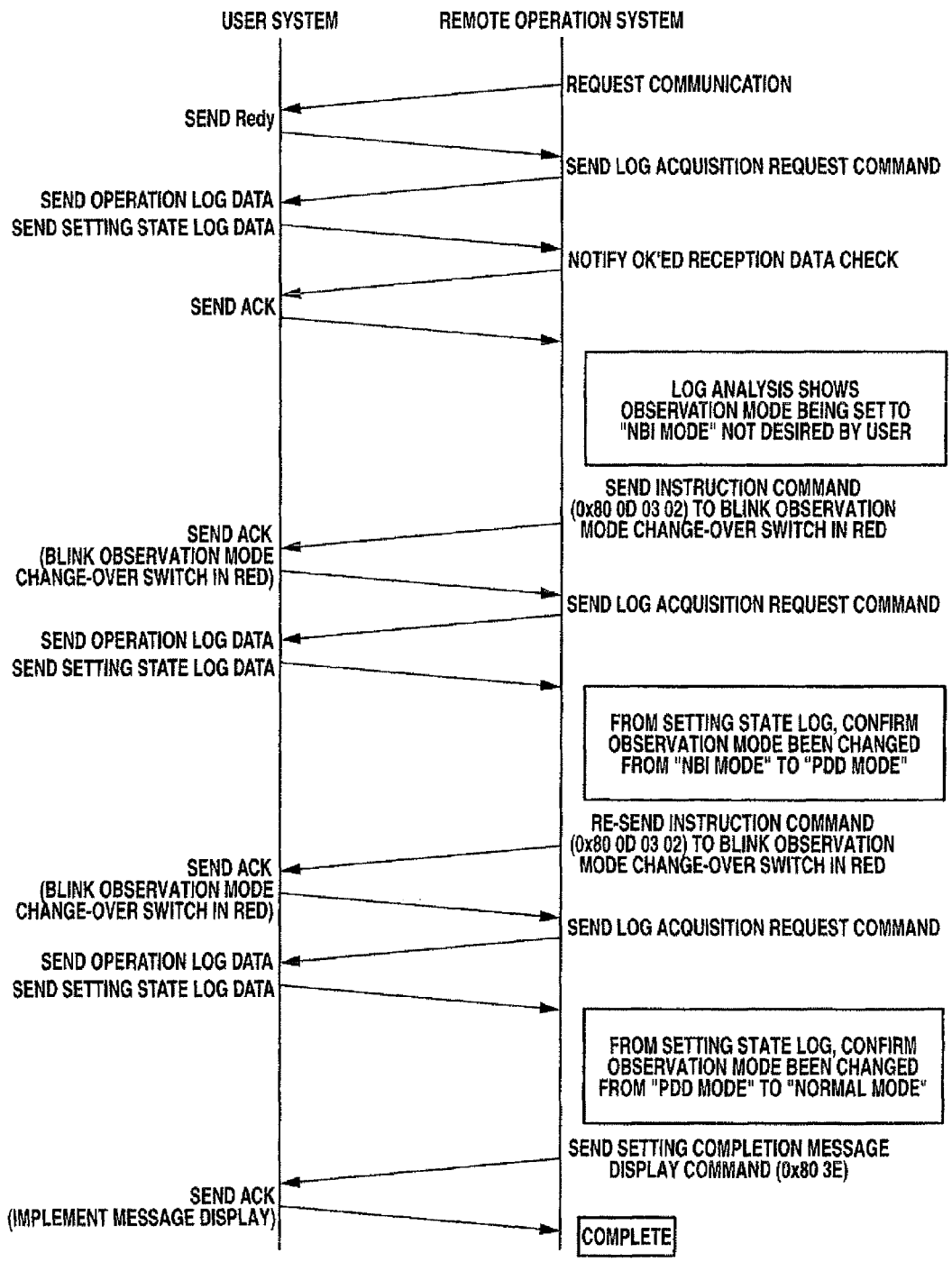
FIG. 38 is a view showing an operation transition of the endoscope system using the touch panel control command of FIG. 33.

FIG. 36 is a third view illustrating the touch panel control command of FIG. 33. FIG. 37 is a fourth view illustrating the touch panel control command of FIG. 33. FIG. 38 is a view showing an operation transition of the endoscope system using the touch panel control command of FIG. 33.

Since the third embodiment is almost the same as the first embodiment, only differences are described. The same components are denoted with the same reference symbols, omitting their descriptions.

Configuration

Action

In this embodiment, the operational transition of the endoscope system is as shown in FIG. 38. In this transition, instead of the LED control instruction command being sent in Transitions 4 and 6 described in FIG. 20, a touch panel control command is sent from the remote operation system to the user system to change the manner of indication of a touch panel 300. The user is thus allowed to visually recognize an erroneous setting as in first embodiment.

Effect

Thus, configuring the operation panel 138 with the touch panel 300, this embodiment enables the user to visually recognize the setting state of the setting values in a more flexible manner of indication, in addition to achieving the effect of the first embodiment.

Fourth Embodiment

Figure 39:
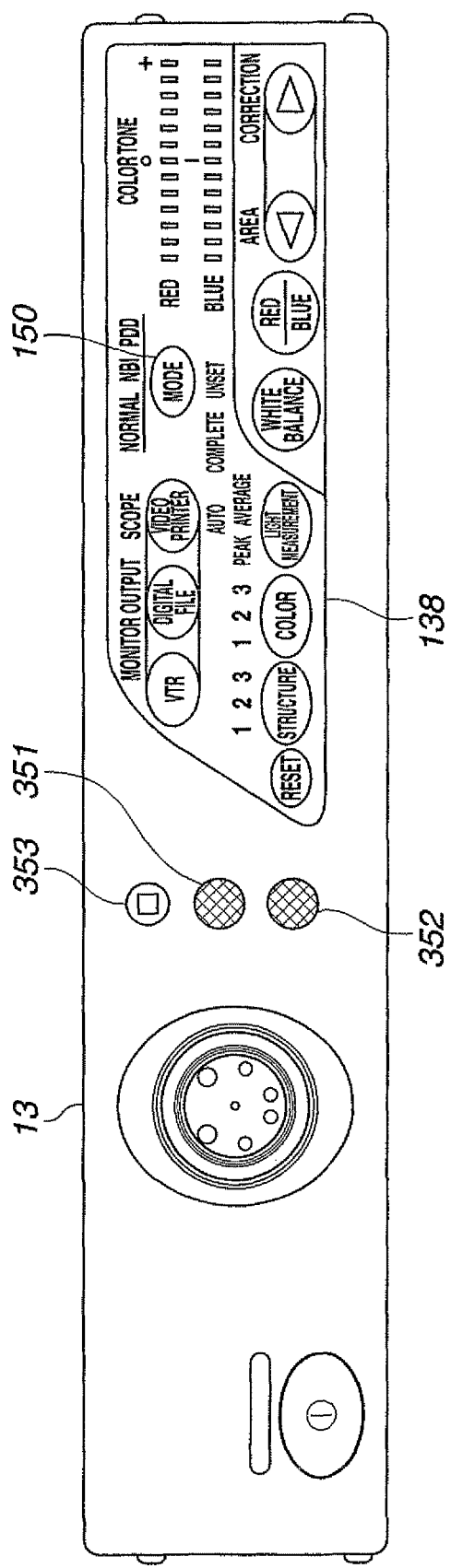
FIG. 39 is a view showing a configuration of an operation panel of a CCU according to a fourth embodiment of the present invention.
Figure 40:
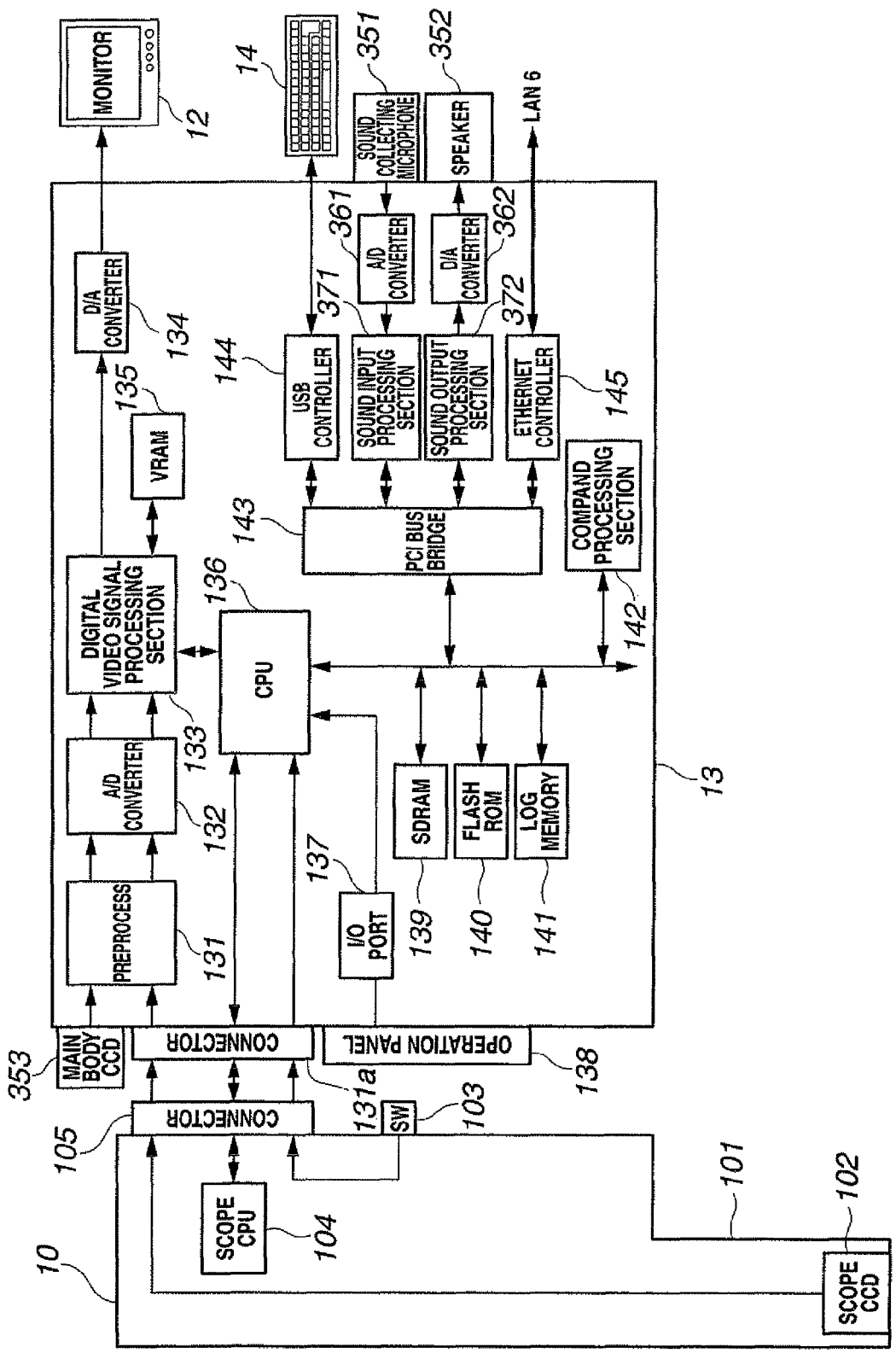
FIG. 40 is a block diagram showing a circuit configuration of the CCU of FIG. 39.
Figure 41:
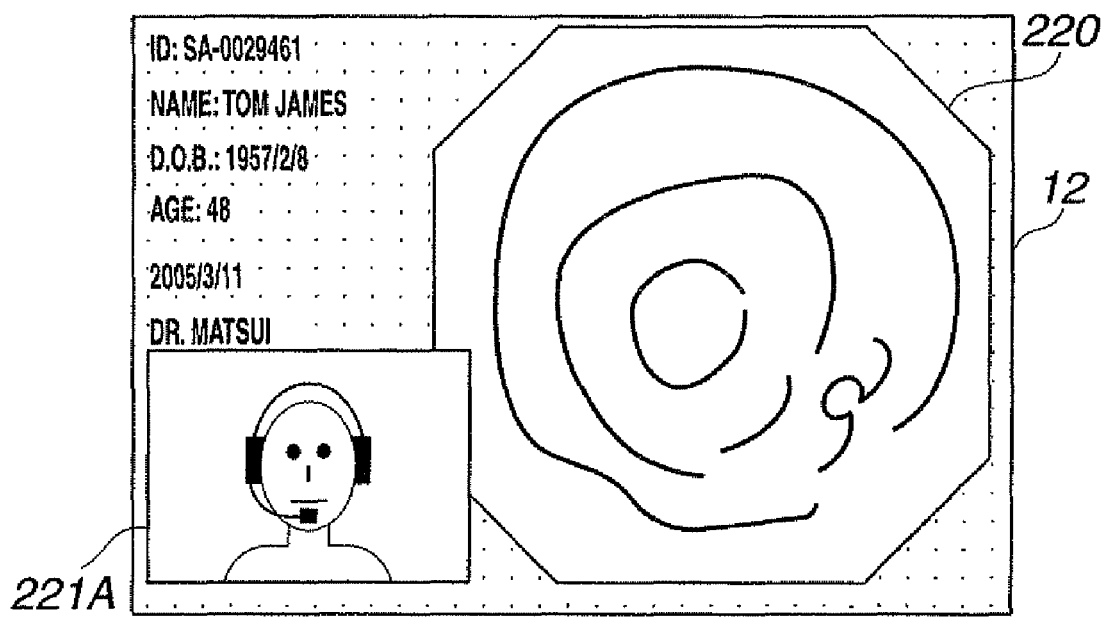
FIG. 41 is a view showing an image window superposed on the endoscopic image displayed on a monitor of FIG. 40.

FIGS. 39 to 41 relate to a fourth embodiment of the present invention. FIG. 39 is a view showing a configuration of an operation panel of a CCU. FIG. 40 is a block diagram showing a circuit configuration of the CCU of FIG. 39. FIG. 41 is a view showing an image window superposed on the endoscopic image displayed on a monitor of FIG. 40.

Since the fourth embodiment is almost the same as the first embodiment, only differences are described. The same components are denoted with the same reference symbols, omitting their descriptions.

Configuration

In this embodiment, a sound collecting microphone 351, a speaker 352, and a main body CCD 353 are provided on the operation panel 138 of the CCU 13, as shown in FIG. 39.

As shown in FIG. 40, in the CCU 13, an A/D converter 361 converts user sound signal from the sound collecting microphone 351 to digital signals, which are then subjected to a known sound recognition processing by a sound input processing section 371. The processed signals are subsequently passed via a PCI bus bridge 143 to be captured by the CPU 136. The CPU 136 thus obtains sound information of the user from the sound collecting microphone 351. Signals of user images picked up by the main body CCD 353 are passed through the same processing path as of the image-pickup signals of the scope CCD 102 via the digital video signal processing section 133 to be captured by the CPU 136 as user video information. The user sound information and video information captured by the CPU 136 are passed through the PCI bus bridge 143 and outputted by the Ethernet (registered trademark) controller 145 to the LAN 6. The outputted information is further transmitted to the remote operation system via the WAN 7.

Likewise, sound information and video information from the remote operation system are captured into the CPU 136 via the WAN 7 and the LAN 6. The sound information from the remote operation system is subjected to a known sound synthesizing processing by a sound output processing section 372. The processed sound information is sent to a D/A converter 362. The converted sound information is then outputted as sound from the speaker 352. The video information from the remote operation system is processed by the digital video signal processing section 133. The processed video information is superposedly displayed as an image window 221A on the endoscopic image 220, as shown in FIG. 41.

Effect

As described above, this embodiment enables the user to check the settings and the like, through sound information and video information. The user is thus allowed to more easily monitor system instrument abnormalities and accordingly set the instrument into a state suitable for the observed situation than in the first embodiment.

The present invention is not limited to the above-described embodiments but may be variously changed and modified without changing the scope of the present invention.

What is claimed is:

1. A signal processing system comprising:
   a signal processing unit including:
      a video signal processing section for processing an image-pickup signal obtained by an image-pickup section picking up a subject image and generating a video signal displayable on a display section; and
      a light source for supplying illumination light for illuminating the subject;
   a control section for controlling, based on a setting value, operation of at least one of an internal circuit of the image-pickup section, an internal circuit of the video signal processing section, and an internal circuit of the light source;
   a setting value changing section for changing the setting value;
   a log recording section for recording change history of the setting value as log data;
   a data sending section for sending the log data to an external instrument via a network; and
   a command receiving section for receiving a control command which is based on the log data from the external instrument via the network,
   wherein the control section controls the setting value changing section based on the control command received from the external instrument.

2. The signal processing system according to claim 1, wherein the control section controls the setting value changing section based on the control command to initialize the setting value.

3. The signal processing system according to claim 1, wherein
   the signal processing unit includes an identification display section for enabling a user to identify a setting item of which setting value is to be changed, and
   the control section controls a manner of indication of the identification display section based on the control command.

4. The signal processing system according to claim 3, wherein the manner of indication of the identification display section is a manner of light emission of a light emission section provided near a setting change switch which is operable to control the setting value changing section.

5. The signal processing system according to claim 4, wherein the light emission section is an LED and the manner of light emission is one of turning on, blinking, and turning off the LED.

6. The signal processing system according to claim 1, wherein the control command when the log data has exceeded a predetermined threshold value is an initialization command for initializing the setting value related to the setting data.

7. The signal processing system according to claim 1, wherein the control section controls displaying of control information which is based on the control command on the display section.

8. The signal processing system according to claim 1, further comprising:
- a power-off moment setting value storing section for storing the setting value when power is turned off; and
- a comparing section for comparing the setting value when power is turned on and the setting value stored in the power-off moment setting value storing section,
- wherein the log recording section records a comparison result of the comparing section.

9. The signal processing system according to claim 8, wherein the data sending section sends the comparison result recorded in the log recording section to the external instrument via the network.

10. The signal processing system according to claim 1, wherein the log recording section records a last setting value which was set when recording the log data as a current value, records a last setting value recorded before recording the log data as a previous value, and generates bit data that indicates presence or absence of a difference between the current value and the previous value based on a result of comparison between the current value and the previous value and writes the generated bit data into the log data.

11. A signal processing system comprising, an endoscope for picking up an image of an inner body cavity by an image-pickup section;
- a light source for supplying illumination light to the endoscope; and
- a signal processing device including a plurality of signal processing sections for processing image-pickup signals from the endoscope, wherein the signal processing device includes:
- a control section for controlling, based on a setting value, operation of at least one of an internal circuit of the endoscope, an internal circuit of the signal processing section, and an internal circuit of the light source;
- a setting value changing section for changing the setting value;
- a log recording section for recording change history of the setting value as log data;
- a data sending section for sending the log data to an external instrument via a network; and
- a command receiving section for receiving a control command which is based on the log data from the external instrument via the network, and
- wherein the control section controls the setting value changing section based on the control command received from the external instrument.

12. The signal processing system according to claim 11, wherein the signal processing device processes image-pickup signals picked up with a plurality of different observation lights, based on the setting value for each of the plurality of different observation lights, which is changed by the setting value changing section.

13. The signal processing system according to claim 11, wherein the log recording section records a last setting value which was set when recording the log data as a current value, records a last setting value recorded before recording the log data as a previous value, and generates bit data that indicates presence or absence of a difference between the current value and the previous value based on a result of comparison between the current value and the previous value and writes the generated bit data into the log data.

\* \* \* \* \*